United States Patent
Champagne

(10) Patent No.: US 7,707,300 B1
(45) Date of Patent: Apr. 27, 2010

(54) METHODS AND APPARATUS FOR TRANSMITTING INFORMATION IN A NETWORK

(75) Inventor: Jean-Philippe Champagne, Goleta, CA (US)

(73) Assignee: Cisco Technology, Inc., San Jose, CA (US)

(*) Notice: Subject to any disclaimer, the term of this patent is extended or adjusted under 35 U.S.C. 154(b) by 1355 days.

(21) Appl. No.: 09/834,796

(22) Filed: Apr. 13, 2001

(51) Int. Cl.
*G06F 15/16* (2006.01)
*G06F 15/173* (2006.01)

(52) U.S. Cl. .................................. 709/231; 709/238
(58) Field of Classification Search ............. 709/203, 709/225, 226, 229, 231, 234, 239, 240, 238
See application file for complete search history.

(56) References Cited

U.S. PATENT DOCUMENTS

| | | | |
|---|---|---|---|
| 6,289,021 B1 | 9/2001 | Hesse | 370/409 |
| 6,370,142 B1 | 4/2002 | Pitcher et al. | 370/390 |
| 6,671,259 B1 * | 12/2003 | He et al. | 370/238 |
| 6,708,215 B1 * | 3/2004 | Hingorani et al. | 709/229 |
| 6,718,387 B1 * | 4/2004 | Gupta et al. | 709/226 |
| 6,754,706 B1 * | 6/2004 | Swildens et al. | 709/225 |
| 6,754,831 B2 * | 6/2004 | Brownell | 726/15 |
| 6,862,622 B2 * | 3/2005 | Jorgensen | 709/226 |
| 7,069,328 B1 * | 6/2006 | Bell | 709/227 |
| 7,191,243 B2 * | 3/2007 | Roy et al. | 709/231 |

* cited by examiner

*Primary Examiner*—Ario Etienne
*Assistant Examiner*—Sargon N Nano

(57) ABSTRACT

Embodiments of this invention can establish a communications path through a network device in a network for a stream of data served by a server. A host can request to receive the stream of data by sending a request through the network to the server. In response, the server creates a data distribution message and sends it onto the network towards the host. Each network device equipped with the invention receives the data distribution message via unicast communications, acknowledges the data distribution message, and creates a path table for the stream of data, and forwards the data distribution message to the next network device on route to the host. A network device that receives an acknowledgment of the data distribution message establishes at least one path through the network device in the path table for payload distribution messages that carry a stream of data. The stream of data can thus be propagated through a network with only one copy of portions (e.g., packets) of the stream traveling per path in the network, irrespective of the number of recipients served by a network device that receives the stream. Since the portions of data are propagated using standard routing protocols, they may pass or tunnel through network devices not equipped with the invention.

26 Claims, 12 Drawing Sheets

| 350-1 PATH TABLE FOR N.D. 110-1 | | |
|---|---|---|
| 360-1 STREAM | 370-1 FORWARD | 380-1 HOST COUNT |
| 115 | N.D. 110-2 | 1 |

| 350-2 PATH TABLE FOR N.D. 110-2 | | |
|---|---|---|
| 360-2 STREAM | 370-2 FORWARD | 380-2 HOST COUNT |
| 115 | N.D. 110-3 | 1 |

| 350-3 PATH TABLE FOR N.D. 110-3 | | |
|---|---|---|
| 360-3 STREAM | 370-3 FORWARD | 380-3 HOST COUNT |
| 115 | H.D. 105-1 | 1 |

FIG. 5

| 350-1 PATH TABLE FOR N.D. 110-1 | | |
|---|---|---|
| 360-1 STREAM | 370-1 FORWARD | 380-1 HOST COUNT |
| 115 | N.D. 110-2 | 2 |

| 350-2 PATH TABLE FOR N.D. 110-2 | | |
|---|---|---|
| 360-2 STREAM | 370-2 FORWARD | 380-2 HOST COUNT |
| 115 | N.D. 110-3 | 1 |
| | N.D. 110-4 | 1 |

| 350-3 PATH TABLE FOR N.D. 110-3 | | |
|---|---|---|
| 360-3 STREAM | 370-3 FORWARD | 380-3 HOST COUNT |
| 115 | H.D. 105-1 | 1 |

| 350-4 PATH TABLE FOR N.D. 110-4 | | |
|---|---|---|
| 360-4 STREAM | 370-4 FORWARD | 380-4 HOST COUNT |
| 115 | H.D. 105-2 | 1 |

FIG. 8

```
                    1 1 1 1 1 1 1 1 1 1 2 2 2 2 2 2 2 2 2 2 3 3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                          Broadcast ID                         |
+-+-+-+-+-+-+-+-+-+-+-+-+-+-+-+-+-+-+-+-+-+-+-+-+-+-+-+-+-+-+-+-+
|                       Broadcasting Source                     |
+-+-+-+-+-+-+-+-+-+-+-+-+-+-+-+-+-+-+-+-+-+-+-+-+-+-+-+-+-+-+-+-+
|Length |    Packet Type      |           Host Port             |
+-+-+-+-+-+-+-+-+-+-+-+-+-+-+-+-+-+-+-+-+-+-+-+-+-+-+-+-+-+-+-+-+
|                         Service Router                        |
+-+-+-+-+-+-+-+-+-+-+-+-+-+-+-+-+-+-+-+-+-+-+-+-+-+-+-+-+-+-+-+-+
|                        Requesting Host                        |
+-+-+-+-+-+-+-+-+-+-+-+-+-+-+-+-+-+-+-+-+-+-+-+-+-+-+-+-+-+-+-+-+
|                      Service Charge Index                     |
+-+-+-+-+-+-+-+-+-+-+-+-+-+-+-+-+-+-+-+-+-+-+-+-+-+-+-+-+-+-+-+-+
```

FIG. 12

METHODS AND APPARATUS FOR TRANSMITTING INFORMATION IN A NETWORK

FIELD OF THE INVENTION

The present invention generally relates to mechanisms and techniques for distributing or propagating information in a communications network, and more particularly, to a system that establishes a data distribution network for data transmitted from source communications devices to destination communications devices.

BACKGROUND OF THE INVENTION

Certain types of communications networks require the ability to support the transmission of streams of data or other information (e.g., voice data, video data or a combination thereof) through the network from a source or transmitting communications device (e.g., a source computer system) to one or more destination or receiving communications devices (e.g., destination computer systems). Using conventional communications technologies such as point to point communications, a source computer system could conceivably transmit a distinct or separate copy of the stream of data using respective distinct individual communications sessions or channels from the source computer system to each destination computer system which is to receive the stream of data. To do so, a source or transmitting host computer system however must replicate packets of information for the stream of data for each of the destination receiving hosts. The source computer system must then establish a communications session to each destination computer system in order to forward one copy of packets of information to each destination computer system. The destination computer systems can then receive, assemble and process their respective packet of information for the stream of data transmitted by the source computer system.

An example of such a point to point communications system is an electronic mail message sent from a single user at a source computer system to multiple recipient users at many different destination or recipient computer systems. A mail program on the source computer system must send a separate copy of the same email message to each recipient computer system. Such point to point communications technologies place a heavy processing burden on the source or transmitting computer systems since the amount of information processing required to transmit the packets of data increases linearly with the number of destination or receiving host computer systems. Moreover, in situations where a source computer system is transmitting large quantities of data, such as when transmitting streams of audio or video data to multiple recipient computer systems, point to point communications techniques can quickly consume large amounts of transmission bandwidth in each network device (e.g., each network router or switch in the network) though which the streams of data pass. Essentially, this results in an inefficient use of network resources (i.e., the routers and/or switches) within the communications network.

To overcome this problem, communications system developers have created a conventional communications protocol called the multicast protocol (or simply multicast or multicasting) that allows for the establishment of a data distribution network within a communications network that avoids transmission of a separate copy of the same data through the same communications devices (i.e., through the same routers or switches) for each destination computer system or other device that wishes to receive the data. Complete details of the operation of the multicast protocol are provided in a request for comment (RFC) documents such as RFC-1112, RFC-1075, RFC-2283 and RFC-1584, each of which are available on the Internet's World Wide Web from the Internet Engineering Task Force (e.g., www.IETF.org), which is an Internet standards organization. The teaching and contents of RFC-1112, RFC-1075, RFC-2283 and RFC-1584 are hereby incorporated by reference in their entirety.

The multicast protocol is ideally used in conventional networks for the distribution of isochronous data or media that requires delivery from one or more sources to one or more destinations within a certain bounded time frame. Typical examples of such isochronous media are real-time voice or video streams of data.

Conventional implementations of the multicast protocol allow one or more source or transmitting computer systems to provide a stream of data (e.g., stream of audio or video data packets) to multiple recipient destination computer systems over a computer network such as the Internet while only transmitting a single copy of the packets of data which comprise the stream from each source. In other words, as contrasted to point to point communications, a source computer system that uses the multicast protocol no longer needs to replicate and transmit data packets for each intended receiver. Instead, the source computer system can transmit a single copy of the packets for the stream of data. The source computer system addresses each outbound packet of data for a common stream of data with a special multicast Internet Protocol (IP) destination address. A multicast IP destination address is an IP address that exists within a designated IP address space assigned by the Internet Address Numbers Authority (IANA, an Internet standards organization that controls network address assignments) for specific use by the multicast protocol. Multicasting addresses are in the IP address range of 224.2.*.*., where the * indicates a value between 0 and 255. In other words, multicast packets are class D IP address packets, which are also called group addressed packets. A multicast group is a stream of packets of data which are all addressed to the same multicast IP address.

In operation, a source computer system for a stream of data transmits all packets for the stream using the same destination multicast address. Routers within the communications network known as IP multicast enabled routers or "mrouters" take the responsibility of distributing and replicating the multicast addressed packets for a multicast data stream (i.e., packets having the same multicast address) so that the multicast packets reach their proper destination host computer systems. In order for this to occur, a host computer systems coupled to a subnetwork of an mrouter can communicate with the mrouter via a protocol called the Internet Group Management Protocol (IGMP) to express an interest in becoming a member of a certain multicast group.

Specifically, a host computer system can transmit an IGMP group "join" message to an mrouter to which is it is attached in order to "subscribe to" a particular multicast group (i.e., a stream of data). The group join message specifies a particular multicast group or stream (i.e., a particular stream of data packets addressed to a specific IP multicast address) which that host would like to access (i.e., would like to begin receiving). When an mrouter receives a join message from a host computer system for a particular multicast group, assuming that the mrouter is not already receiving packets associated with that multicast group, the mrouter uses a multicast routing protocol such as the Distance Vector Multicasting Routing Protocol (DVMRP) to allow that mrouter to create a multicast path or branch to another mrouter which is already receiving packets of data associated with the multicast group. When the other mrouter that is already receiving packets for the multicast group receives a request from an mrouter that is not currently receiving packets for the multicast group but would like to, the mrouter already receiving the multicast packets creates a branch in the multicast group distribution network such that the multicast group packets are now also delivered along a path in the network to the mrouter that requested receipt of such packets.

A multicast routing protocol such as DVMRP thus allows an mrouter to be "added in" to a distribution network of mrouters which receive and distribute data packets associated with a particular multicast group. In this manner, multicast routing protocols such as DVMRP result in a creation of a distribution tree of mrouters for the data packets associated with multicast groups. When the multicast group packets reach an mrouter in which they must be distributed in different directions (i.e., along different paths to different recipient host computer systems), that mrouter then duplicates the packets and transmits one copy along each different branch of the multicast distribution network. As a result, network traffic over network data links in the multicast distribution network remains much lower than point to point communications and remains the same, irrespective of the number of intended recipients for the stream of data. This is because multicast group traffic (i.e., the packets for a stream of multicast data) are only sent once along each branch of path in the multicast distribution network of mrouters which is established and maintained by a multicast routing protocol such as DVMRP.

SUMMARY OF THE INVENTION

Conventional techniques for distributing copies of the same data in a network, such as conventional multicasting techniques for delivering streams of video or audio data to multiple recipient host computer system suffer from a number of deficiencies. Most notably, conventional techniques such as multicasting require an allocation of special multicast network addresses for use with such techniques. Packets of data transmitted through a network using conventional multicasting techniques must include one of these special multicast addresses such that network devices that support the multicasting protocol can detect and route these specially addressed packets according to the multicast routing protocols, such as DVMRP. The multicast address range is limited in size. Since all packets of data within each different multicast stream of data require the use of a multicast address uniquely identifying that stream, situations can also arise in conventional multicast networks where two or more different multicasting events, such as the creation of two or more new streams of data, accidentally result in use of the same multicast address. When the two streams a transmitted onto the same network, a clash of multicast addresses results since different streams of data are using the same multicasting address.

Conventional multicasting techniques also suffer in that in order for host computer systems to benefit from their use, all network devices that exists (i.e., that are coupled) in the network from the server computer system to the recipient host computer systems must be equipped to handle the multicast addressed packets. In other words, if a router within the network is not an "mrouter" and is not multicast enabled, it will fail to recognize the multicast address and will not properly route the packets for the multicasted stream of data. As such, conventional multicasting techniques do not support "inter-domain collaboration." That is, there is no way for multicast streams to be "tunneled" through non-multicast enabled devices such as routers that do not support multicast.

In contrast to conventional systems and techniques for distributing streams of data through a network such as conventional multicast techniques, embodiments of the present invention provide mechanisms and techniques to establish a communications path through a network device in a network for a stream of data. Such methods can perform, for example, in a network device in a communications network such as a computer network. The techniques of embodiments of this invention allow packets containing data such as streaming data to be tunneled or otherwise transported through devices such as routers that are not equipped with the invention while still maintaining the multi-cast like benefits of transporting only one copy of the streaming data over data links in the network that are required to carry such data. This allows host devices located in remote parts of a network to receive streams of data when some network devices within the network do not perform the operations of the invention.

Also, unlike multicast, packets or other portions of data distributed according to this invention do not require special address assignments. Instead, packets can be addressed and routed using standard network routing and addressing techniques such as by using IP packet headers containing the addresses of router or host devices in the network. The packets carrying stream data are thus distributed from network device to network device using conventional routing techniques. In network devices equipped with the invention, the packets are recognized as being special by an embedded header called a data distribution header that exists within (e.g., is encapsulated by) a standard packet header such as a Uniform Datagram Protocol (UDP) or Real Time Protocol (RTP) header. The special data distribution header contains a stream identifier that identifies a stream of packets (e.g., other packets containing stream data) of data served onto the network by a server device. The data distribution header thus allows network devices such as routers equipped with this invention to intercept such data distribution packets in order to setup paths through the network device for other data distribution packets that also contain a version of the data distribution header identifying the stream to which those data distribution packets are associated.

Generally, the invention defines a protocol that allows network devices to establish a distribution network for packets of data associated with a particular stream identifier. Using this network, the server device can forward a single copy of each packet of data for a stream of data onto the network. The network devices can use the distribution network to distribute one copy of these packets onto each path through the distribution network, thus avoiding having to transport duplicate copies of the packets of data on the same link, regardless of how many downstream recipient hosts are to receive the data.

In particular, method embodiments of the invention include the steps of receiving a first data distribution message from an upstream device in the network, acknowledging receipt of the first data distribution message to the upstream device in the network, and forwarding a second data distribution message to a downstream device in the network. As noted briefly above, each data distribution message contains a special data distribution header that identifies a stream of data. The method then determines if the network device (i.e., the one operating this method) receives an acknowledgment of receipt of the second data distribution message. If an acknowledgment is received, the method establishes at least one path through the network device for the stream of data between the upstream device and a downstream device identified in the acknowledgment. In network devices that do not support the data distribution protocol of this invention, those devices still receive data distribution messages and acknowledgements, but simply forward the data distribution messages and the acknowledgments between the upstream and downstream devices that originate such messages.

In this manner, this method can apply to devices that are equipped with the protocol capabilities of the invention to establish a path for the stream of data through the device. However, for devices not equipped with the protocol handling capabilities of this invention, those devices can simply receive the data distribution messages, forward such messages to a downstream host or network device to which it is addressed, and when an acknowledgement is received in the upstream direction (if the downstream device is a network device such as a router that uses the invention), then the conventional device not equipped to setup a distribution network using the protocol of the invention can simply forward the acknowledgement upstream to its intended destination. In other words, the system of the invention uses messages that can be routed via network devices such as routers that are not equipped with the invention.

Preferred embodiments of the invention are thus network devices such as routers or other data communications devices that operate a data distribution protocol as explained herein. In such embodiments, the method step of receiving a first data distribution message from an upstream device in the network comprises the steps of obtaining, from the first data distribution message, a stream identifier that identifies the stream of data for which the communications path is to be established through the network device. The stream identifier is any type of indication in the data distribution message of an identity of a stream of data. The method then stores the stream identifier in a path table. The path table is used by a data distribution process in the network device, as will be explained, to identify paths for the stream of data through the network device. The method then configures an upstream device identifier in the second data distribution message with an identity of the network device that received the data distribution message to create the second data distribution message. As such, when the step of forwarding is performed, the second data distribution message now contains the identity of the network device that just received it and a downstream network device that receives this message and that operates according to the invention can acknowledge this second data distribution message and can operate as explained herein to further develop the paths for the stream of data.

In another embodiment, the step of establishing at least one path through the network device between the upstream device and the downstream device comprises the steps of obtaining a downstream device identifier from within the acknowledgment, the downstream device identifier identifying a downstream network device that supports the data distribution protocol and that originated the acknowledgment. The method also obtains a stream identifier from within the acknowledgment. The stream identifier identifies a stream of data to which the acknowledgment is associated. The method also creates a path entry in the path table for a stream of data identified by the stream identifier in the acknowledgment received by the network device by associating the downstream device identifier to the stream identifier in the path table to create a path for the stream of data to each downstream device associated with the stream identifier.

In this manner, when a network device operating according to the invention gets a first data distribution message, then configures its own identity into the second data distribution message, and then forwards the second data distribution message to the next downstream device (e.g., using conventional routing techniques to forward this second data distribution message further towards its destination which is an end-user host device), if the downstream device is another network device equipped with the invention, then that downstream device will acknowledge receipt of the second data distribution message (and will treat the received second data distribution message as a first data distribution message with respect to that network device and will repeat the process explained here). The downstream device then returns an acknowledgement to the upstream device that forwarded the second data distribution message. The acknowledgement contains a stream identifier (the same stream identifier as was contained in the first data distribution message that caused the acknowledgment to be sent back to the upstream network device) and also contains a downstream device identifier, such as a network address, router name or any other identifier of the downstream network device that is acknowledging receipt of the second data distribution message. Using this acknowledgement information, the upstream network device can create a path entry in the path table associated with this stream identifier (the path table being initially created upon initial receipt of the first data distribution message by this network device). The path entry lists the downstream network device as one recipient device (i.e., as one path to take) for packets of data that will be received in the future (i.e., packets of data that will be served from a server device onto the network) that contain this stream identifier.

In this manner, the system of the invention is able to allow a server device to serve data onto a computer network in a multi-cast like manner, but without the limitations of conventional multicasting or other conventional data distribution protocols. In particular, the system of the invention allows network devices such as routers to receive data distribution messages for the data to be served from a server device. As will be explained, the first data distribution message originates from the server device in response to a particular host device on the network requesting to receive the data from that server device. The first data distribution message may, for example, include a data distribution header indicating that this data distribution message is an "open link" or "create path" data distribution message. Such a data distribution message causes each network device equipped with the data distribution protocol capabilities of this invention to setup the path table (if not already in existence for this stream) and, upon receiving an acknowledgement from the next downstream network device of the second data distribution message (also containing the open-link header information), the network device configures the path to that downstream device in the path table. This process continues until the first data distribution message reaches the host device to which it is addressed (i.e., the host device that requested to receive the stream of data from the server device).

The last network device along the path from the server to the host can detect that it is the end device (e.g., an end router) in a number of ways. For example, the host will typically discard the second data distribution message as it does not need to have knowledge of the protocol of this invention. The last network device (e.g., router) in the network path from the server to the host to perform the operation explained above will thus experience a timeout after attempting to transmit (or re-transmitting multiple times) the first data distribution message to the host. Alternatively, the last network device will receive an "ICMP Port Unreachable" message from the host. In another alternative, the end router can "know" it is the last network device before the host if it "serves" or is on the same subnet as the host, in which case there is no need to forward the second path establishment message to the host from the end network device.

Thereafter (i.e., once path table(s) including paths exist in network devices in the network), any packets of data for the stream served by the server device will include a data distribution header that indicates that the packet of data is associated with a particular stream of data from the server device. Using the stream identifier in each data distribution packet of stream data moving through the network, each network device operating this invention can consult the path table for that stream identifier to determine which interface(s) or data link(s) (i.e., which outbound path(s)) that packet of data is to be re-transmitted upon. This way, the packets of data are only sent once on any particular data link in the network and are tunneled through the network using the paths. If a network device needs to duplicate the packet of data for different paths (as indicated by multiple path entries in the path table for that stream identifier), then it does so for each path for that stream of data.

In one embodiment, the stream identifier includes at least one of i) a data indicator for the stream of data, and/or ii) an identification of the server computer system providing the stream of data.

In another embodiment, the step of creating a path entry in the path table for the stream of data identified by the stream identifier includes the step of incrementing a host device counter associated with the path entry in the path table for the stream of data in order to track how many host devices (e.g., downstream hosts) use a path defined by the path entry in the network device to receive the stream of data. By maintaining a host count for each path, the network device can know when to remove a path table. Host devices no longer desiring to receive a stream of data can send a request to the server device to stop receiving the stream. The server device can then create a data distribution cancellation message addressed to this host device that indicates that this host is to no longer receive the stream of data. This data distribution cancellation message propagates through the network devices in the network. Each network device equipped with the protocol of this invention recognizes packets containing the embedded data distribution cancellation header and can forward a data distribution cancellation message further towards to the host device through the network. These network devices will also decrement the host count for the path upon which that data distribution cancellation message is sent.

When a path in the path table for a stream of data contains a host count of zero, then no downstream host devices are receiving data on this path. As such, the network device can remove this path from the path table. When all paths for a stream of data have a host count of zero, then no downstream host devices are receiving streams of data for this stream identifier through this network device. As such, this network device can remove the path table from its instantiation (i.e., can remove it from memory).

In another embodiment, if, in the step determining if the network device receives an acknowledgment on the communications interface of receipt of the data distribution message, the network device determines that it did not receive the acknowledgment (e.g., after sending multiple data distribution messages towards the host), or if the network device receives a return acknowledgement error message such as an "ICMP port not supported" message from the host, then that network device can assume that the downstream device is a host device. This is because host devices do not operate embodiments of the invention. As such, they will not recognize and will thus not respond (or will respond in error) to data distribution messages. As such, the method performs the operations or steps of establishing at least one host path through the network device for the stream of data. The host path indicates that a host device coupled to the network device is to receive the stream of data. The method then receives portions of data for the stream of data. The portions of data are associated with a stream identifier in the path table having the host path as at least one of its paths. The method then removes payload data from the portions of data and forwards the payload data to the host device as the stream of data on the destination port expected by the host.

As an example of this embodiment, a data distribution message is typically sent from a server device and is addressed using a conventional packet header (e.g., an IP header) that contains a destination address of a host device that requested to receive the stream. When the a network device (e.g., a router) in the network receives this data distribution message and this network device contains a direct connection to this host device (e.g., the host is on a subnet which this router serves), the router (i.e., the end router or last router) attempts to send the data distribution message (i.e., as the second data distribution message discussed above) directly to the host device (using conventional routing techniques based on the IP header of the data distribution message). However, the host will not respond with an acknowledgement of the data distribution message (as defined herein, such an acknowledgement contains a version of the special data distribution header), or will respond with an error message (e.g., ICMP port not supported). Accordingly, after a timeout or after multiple retransmissions or after receiving the error message, the last or end network device (e.g., end router) can assume that the host device received the data distribution message (since no acknowledgement is received). This can be verified, for example, by comparing the host address (e.g., contained in the destination IP address field of the data distribution message packet header) with routing tables in the end network device to determine that this network device is the network device which couples this host device to the network. In other words, this is the router or other network device that the host device uses to communicate on the network and is on the same subnet as the network device. When the network device makes this determination, the network device creates a host path entry in its path table for this host device. This is called a "host path entry" because it indicates to this network device that it is the last network device that will handle portions of data from the server device for this stream of data.

When a network device receives portions of data for the stream of data that, based on the host entry in the path table, are to be sent directly to this host device, the network device must extract the payload portion of this portion of data. The payload portion is the original data that the server device is streaming onto the network. In other words, as a portion of data for the stream of data is sent through the network from the server device to the network devices that operate as explained herein, the portion of data contains a standard IP packet header as well as a data distribution header (e.g., indicating, via a packet type field, that this is a portion of data associated with a particular stream), and also contains an encapsulated header such as a UDP packet header from the server device and a payload data portion which is the actual data (e.g., audio, video or other type of data) for the stream of data. When the last network device gets this portion of data, the last network device (containing a path table having the host path entry) removes the standard packet header and the data distribution header and forwards the payload data on to the host device in a format expected by the host in accordance with the streaming protocol in use. This can be done, for example, using a UDP header for the stream of data (as created by the server device) such that the host device is provided with a standard UDP packet containing the payload data. The host device thus is unaware of the processing of this invention within network devices to allow that data to be propagated through the network as explained herein. Instead, the host device "thinks" that the stream packet that it receives came directly from the server device and was addressed to this host device.

In another embodiment, the step of receiving a first data distribution message from an upstream device in the network comprises the steps of forwarding, to the upstream device in the network from which the data distribution message originated, an acknowledgment (e.g., an upstream acknowledgment) of receipt of the data distribution message. As noted above, this allows acknowledgements of data distribution message to cause path entries to be created in upstream network devices that operate according to this invention.

In another embodiment, the acknowledgment sent upstream includes a downstream device identifier identifying the network device (the one creating the acknowledgment) as a downstream device with respect to the upstream device that originated the data distribution message (i.e., that prompted the acknowledgment) and to which the acknowledgement (i.e., the one sent upstream) is forwarded. The acknowledgment includes a stream identifier identifying a stream of data to which the acknowledgment is associated. The acknowledgement is received by the upstream device that originated the data distribution message and is treated as a downstream acknowledgement forwarded from the network device and thus the network device receiving this acknowledgment create a corresponding path entry for the stream identifier contained therein, if such a path is not already in existence.

In another embodiment, the downstream device is a network device and wherein the step of forwarding forwards the entire second data distribution message to the downstream device such that the downstream device can establish a communications path through the network for the stream of data.

In another embodiment, the downstream device is a host device that requested receipt of the stream of data and the step of forwarding comprises the step of forwarding a data stream portion of the stream of data in the first data distribution message to the host device such that the host device can receive the stream of data over the communications path through the network.

In another embodiment, the first data distribution message contains a destination network address identifying a host device which provided a request to a server device for the stream of data served from the server device and the step of forwarding forwards the at least a portion of the first data distribution message to a downstream device using a routing protocol that selects a route that forwards the first data distribution message towards a host device which provided the request to the server device for the stream of data.

In another embodiment, if the routing protocol determines that there are multiple routes that can be used to forward the second data distribution message towards a host device which provided the request to the server device for the stream of data, the routing protocol selects a route to a downstream network device that contains an established path for the stream of data identified by a stream identifier within the first data distribution message. In other words, if a first data distribution message is received by a network device for which a path already exists in the path table that corresponds to a path towards the host device to which that first data distribution message is addressed, then the second data distribution message is preferably forwarded towards the host device along that path (i.e., on that outbound link). This might, for example, override a standard routing protocol decision to send the second data distribution message on another link to that host for example, when the network is congested.

Another method embodiment includes the steps of receiving a portion of data associated with the stream of data. The portion of data originates from a server device that serves the stream of data and includes a data distribution header containing a stream identifier for this portion of data. The method also performs a step of forwarding the portion of data to a downstream device associated with each path for the stream of data as identified in a path table associated with the stream identifier, such that the portion of data is distributed on each path in the path table towards host devices that requested to receive the stream of data.

Embodiments of the invention also include network devices configured to operate according to the invention. As noted herein, such network devices can be any type of electronic or computerized network device. In particular, such a network device can comprise a communications interface, a memory system, a processor and an interconnection mechanism coupling the communications interface, the memory system, and the processor. The memory system is preferably configured with a data distribution application, that when performed on the processor, provides a data distribution process that establishes a communications path through the network device in a network for a stream of data by performing any or all (e.g., any combination) of the aforementioned method embodiments, steps and/or operations via software control, or via hardware and/or software configured to perform those methods and the techniques disclosed herein as the invention. Preferred embodiments of such a network device are a router configured to operate as explained herein.

Other embodiments of the invention that are disclosed herein include software programs to perform, when executed, the method operations of embodiments summarized above and disclosed in detail below. More particularly, a computer program product is disclosed which has a computer-readable medium including computer program logic encoded thereon to establish a communications path through the network device in a network for a stream of data according to this invention and its associated operations. The computer program logic, when executed on at least one processor within a communications device, causes the processor to perform the operations (e.g., the method embodiments, steps and operations summarized above, and described in detail later) indicated herein. This arrangement of the invention may be provided as software on a computer readable medium such as an optical medium (e.g., CD-ROM), floppy or magnetic hard disk or other such medium such as firmware in one or more ROM or RAM or PROM chips (e.g., EPROM or EEPROM) or as an Application Specific Integrated Circuit (ASIC). The software, firmware or other such configurations can be installed onto a communications or network device such as a router, switch, or the like to cause the communications device to perform the techniques explained herein as the invention.

Another embodiment includes a packet transportable in a network or encoded within computer readable medium such as a memory within a network device. The packet can be embodied in a computer readable medium such as within input and output buffers of network devices such as routers, or within a communication interface of a server device, or within a network propagated signal such as provided over a communications link from one device to another during transmission of the packet in a communications network. The packet contains a standard packet header portion containing a destination address of a host device in the network, and a data distribution header portion encapsulated by the standard packet header portion. The data distribution header contains a stream identifier identifying a stream of data for which a path can be established through at least one network device in the network. The packet also contains a payload portion containing data such as stream data to be delivered to a host device in the network.

It is to be understood that the system of the invention can be embodied strictly as a software program, as software and hardware, or as hardware alone. It is also to be understood that the techniques and mechanisms of this invention typically perform (e.g., execute, run, or are otherwise operated) on one or more communications or network devices that operate in any type of communications system. The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 5 illustrates an example of the contents of path tables for the network devices illustrated with respect to the example network configuration in FIG. 2.

FIG. 8 illustrates four path tables.

FIG. 12 illustrates an example header format.

DETAILED DESCRIPTION OF PREFERRED EMBODIMENTS

Figure 1:
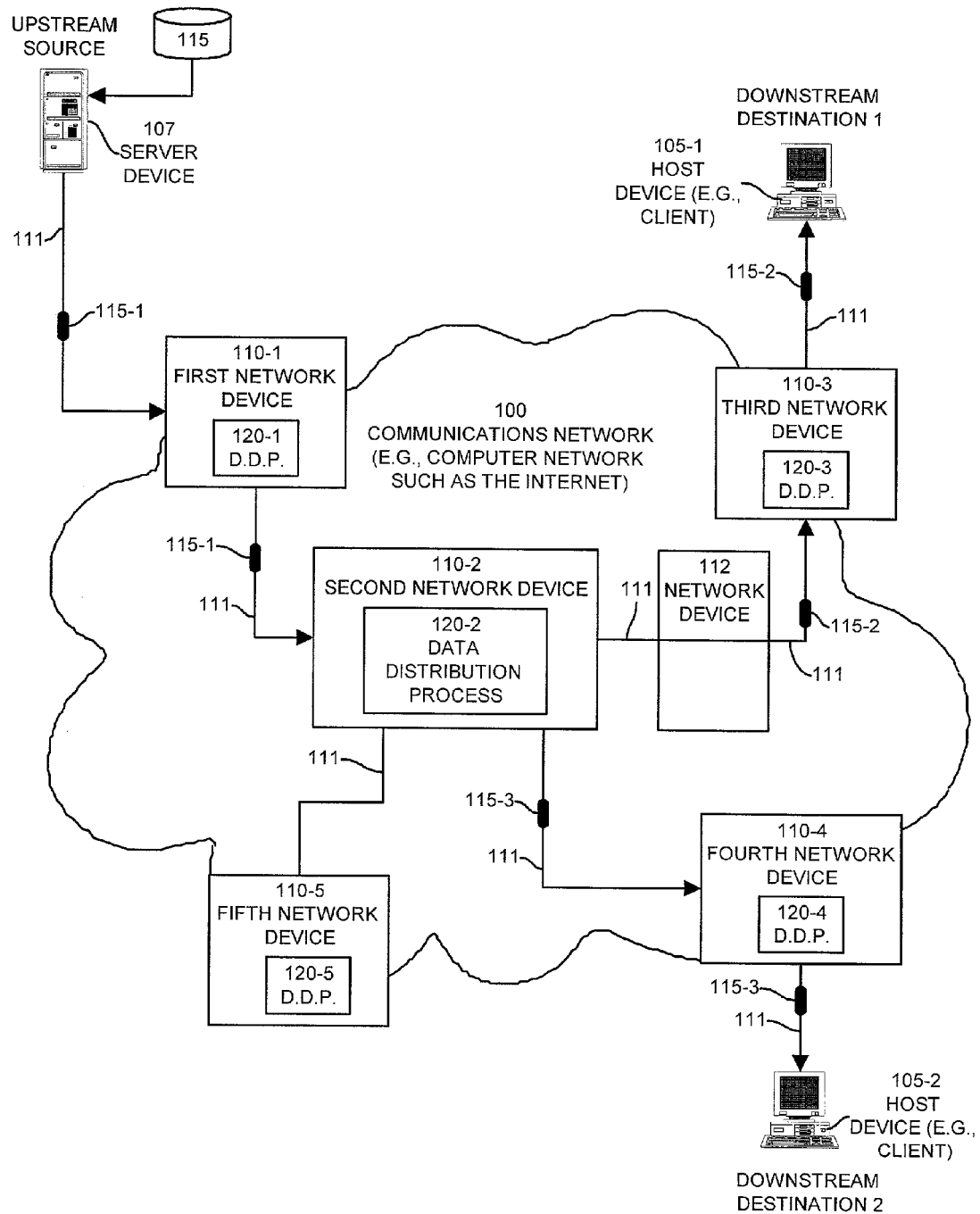
FIG. 1 illustrates a network and communications system environment that is suitable for use in describing example operations of embodiments of the invention.

Embodiments of the present invention provide mechanisms and techniques for distributing data, such as a stream of data, from a server device such as a server computer system to one or more recipient host devices such as host computer systems over a communications network. Operations of embodiments of the invention provide a data distribution protocol that uses data distribution messages to create paths through network devices in the network. The paths form a data distribution network for distribution of portions (e.g., packets) of the stream of data using payload distribution message through the network. Network devices only need to transmit the payload distribution messages once over a particular distribution link or path, irrespective of the number of host devices that receive the stream data encapsulated within the payload distribution messages in the distribution network after (e.g., downstream from) traversing that path or link. As such, a server device operating in accordance with embodiments of the invention is only required to transmit payload distribution messages containing a stream of data once onto the network to each network device to which that server directly connects and which serve host devices desiring to receive the stream of data.

Network devices (e.g., routers, switches, or the like) within a communications network that are equipped with embodiments of the invention are then able to propagate portions of the stream of data to host devices which requested to receive that stream. When a network device such as a router operating an embodiment of the invention receives a portion of data for a stream of data which must be distributed to multiple host devices that exist on different data links or paths that extend from that network device (i.e., a branch point), the network device at that point duplicates the portions of data of the stream for distribution onto the different paths or links. This avoids unnecessary duplication of portions of data for the stream of data as the stream is distributed through the network to the destination or downstream host devices which requested to receive that stream.

A server device operating in accordance with embodiments of the invention does not address portions (e.g., packets) of a stream of data using a multicast network address, as is done in conventional multicast data distribution techniques. Instead, portions of the stream of data contain regular source and destination unicast network addresses (e.g., regular IP addresses of recipient host devices on the network). Such portions or packets also contain a special embedded header portion called a data distribution header provided according to embodiments of the invention. Since portions of the stream of data are assembled or prepared and transmitted by devices (e.g., a server device and network devices) configured according to embodiments of the invention and include a unicast IP addresses, a communications network (e.g., a network of routers) can distribute such portions using conventional routing protocols and data distribution techniques (e.g., IP routing protocols such as OSPF). The data distribution header allows network devices such as routers that are equipped with embodiments of the invention to recognize those portions of data and to route those portions according to the data distribution paths that are established by the invention as explained herein.

Not all network devices within the communications network are required to be equipped with embodiments of the invention. In other words, a communications network can be configured with some network devices such as routers that are equipped with the invention, while other network devices (e.g., other routers, switches, or the like) in the network might not be equipped to operate according to the data distribution protocol techniques of embodiments of the invention. The non-protocol-equipped devices might exist (i.e., might be coupled) in the communications network in between devices enabled with the invention. Furthermore, host devices such as end-user computer systems that receive streams of data distributed through a network according to embodiments of the invention do not themselves require any special configuration or modification. That is, preferred embodiments of the invention do not require that host devices or all network devices (e.g., every router in a network) implement any special configuration in order to operate and benefit from embodiments of the invention that are implemented within servers and some network devices in a communications network that do contain the configurations explained herein.

Figure 2:
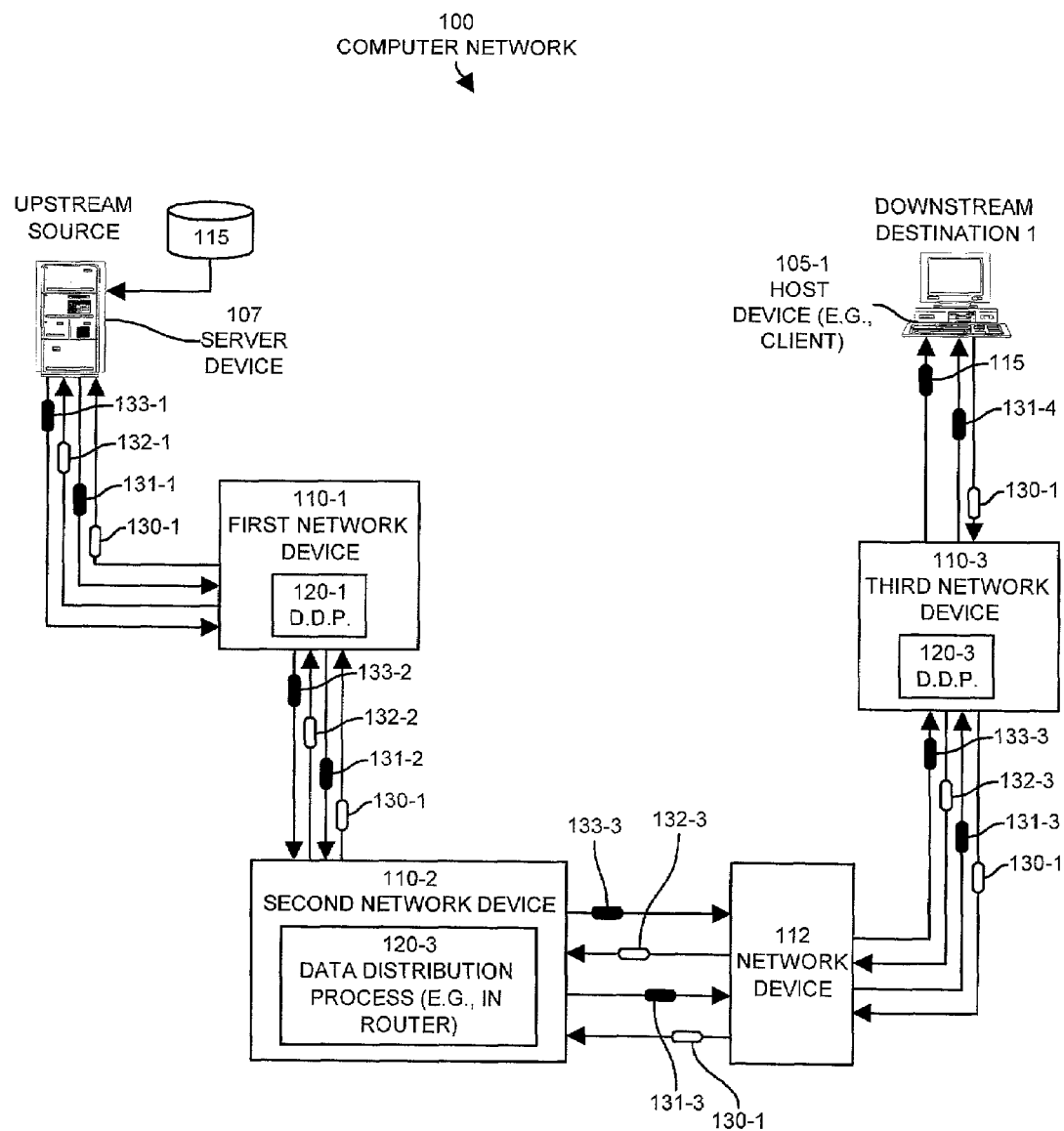
FIG. 2 illustrates communications that take place between network devices, host devices and server devices to allow a host device to begin receiving a stream of data from a server device through network devices configured according to an example operation of embodiments of the invention.
Figure 3:
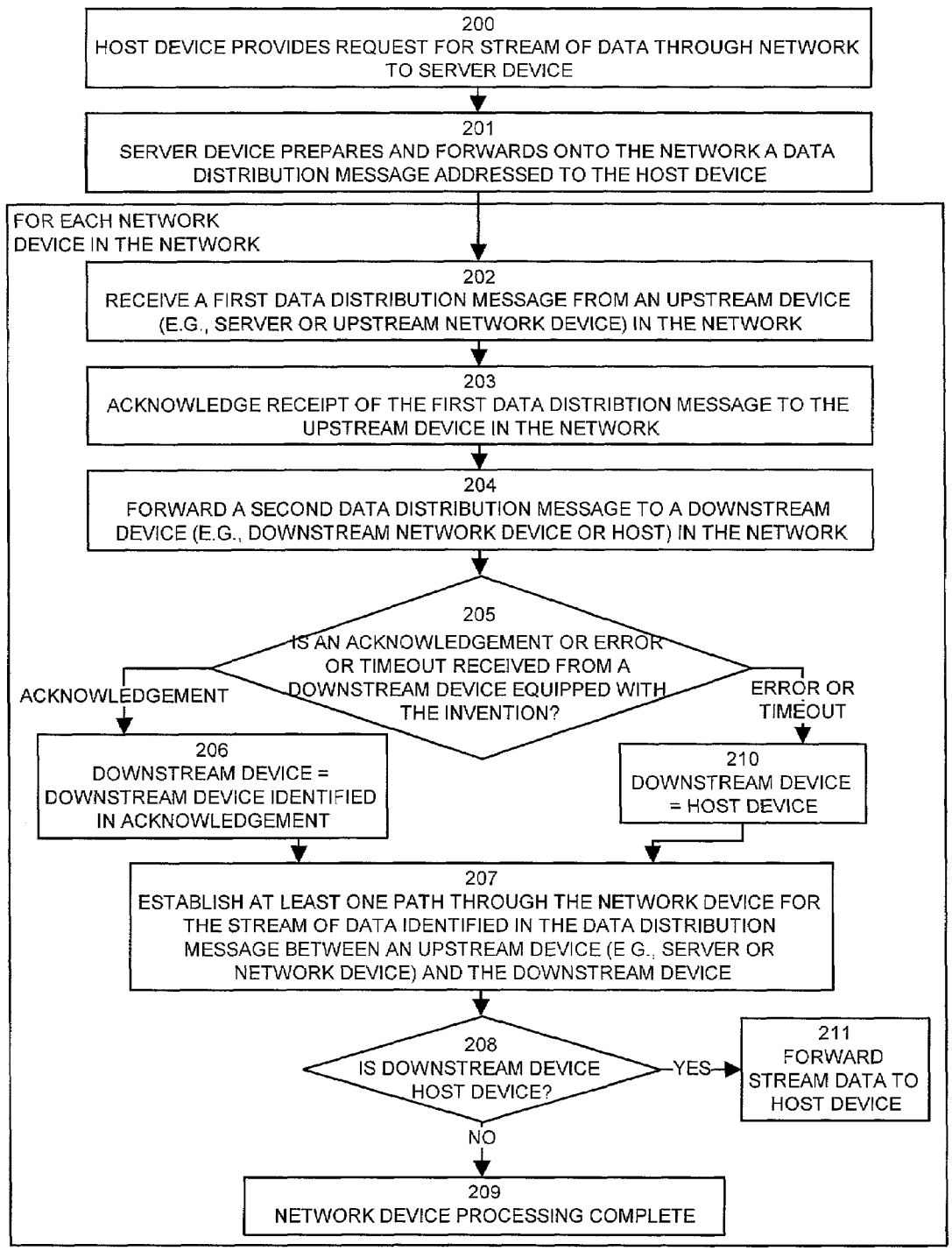
FIG. 3 is a flow chart of processing steps that disclose a method for establishing a communications path through a network device in accordance with embodiments of the invention.

A general description of the operation of embodiments the invention will be provided next with respect to an example configuration of a communications network illustrated in FIGS. 1 and 2 and with respect to the flow chart of processing steps shown in FIG. 3.

FIG. 1 illustrates a simple example communications network 100 which is suitable for use in explaining example operations of embodiments of the invention. The communications network 100 in this example is a computer network which may be, for example, the Internet, a local or wide area network (LAN or WAN), or any other type of computer or data communications network. The computer network 100 includes interconnections 111 (e.g., communication links) of various host devices 105-1, 105-2 (only two shown in this example), one or more server devices 107 (only one shown in this example), and a plurality of network devices 110-1 through 110-6 and 112. The network devices 110-1 through 110-5 are each equipped with a respective data distribution process 120-1 through 120-5 configured to operate in accordance with embodiments of the invention. Note that in this example, the network device 112 is not equipped with a data distribution process and is not configured to operate the data distribution protocol of the invention. The interconnections 111 represent any type of data communications link such as a wireless or physical communications links. Examples include optical connections, electrical connections such as Ethernet, or the like.

The host devices 105 may be any type of user controlled (users not specifically shown) host computer systems or devices such as personal computers, workstations, wireless devices, personal digital assistant (PDA) devices, or other computerized or electronic devices which include a network communications interface (not specifically shown) allowing the host devices 105 to perform communications (e.g., data and/or voice or other communications) with at least one network device 110.

The server device 107 (there may be more than one) may be any type of computer system or electronic device that also includes a network communications interface (not specifically shown) allowing the server device 107 to perform communications with at least one network device 110. Generally, and as will be explained in more detail, the server device 107 operates according to embodiments of the invention to serve data 115 as a stream of data (e.g., real-time voice, video, multimedia or other real-time or non-real time streams of data) onto the computer network 100 for distribution by the network devices 110 to various host devices 105 which requested to receive such streams of data.

The network devices 110 and 112 may be network routers, switches, or other types of networked data communications devices which can distribute data portions such as packets, cells, frames or other types of defined and addressable data units within the computer network 100. For this example, the computer network 100 may operate as an Internet Protocol (IP) network and thus the network devices 110 and 112 can distribute data portions using traditional IP routing and data distribution techniques. This means that portions of data transmitted between the network devices 110 and 112 contain a standard IP packet header containing source and destination IP addresses identifying respective source and destination devices coupled to the network 101. The network devices 110 configured according to embodiments of the invention can operate traditional or conventional network data routing protocols such as the Open Shortest Path First (OSPF) protocol to distribute such data portions based on a packet header contained within each data portion.

Each network device 110 shown in FIG. 1 is equipped with a data distribution process 120 (D.D.P.) configured to operate in accordance with embodiments of the invention, as will be explained shortly. Generally, in the network device 110, the data distribution process 120 implements the data distribution protocol defined by embodiments of the invention and allows the network devices 110 to distribute portions of data 115 served by the server device(s) 107 to the host devices 105 which requested to receive such streams of data. Since the server device 107 in FIG. 1 operates as the source device for one or more streams of data 115 served to one or more requesting host devices 105, the server device 107 is referred to herein as the "upstream source" for the stream of data. Since the host devices 105 receive the stream(s) of data 115 through the networked arrangement of network devices 110 operating according embodiments of the invention, the host devices 105 are referred to as "downstream destinations."

According to the general operation of the system of the invention as illustrated in the example network 100 in FIG. 1, the data distribution processes 120 interoperate according to embodiments of the invention to allow the server device 107 to serve a single stream of data 115 to multiple host devices 105-1, 105-2, etc. via the first network device 110-1. The first network device 110-1 operates its data distribution process 120-1 to establish a path 115-1 for the stream of data from the server device 107 through itself to the second network device 110-2. For purposes of explanation herein, the first network device 110-1 is considered a downstream device with respect to the server device 107 and is considered an upstream device with respect to the second network device 110-2.

When the stream of data 115-1 reaches the second network device 110-2, the data distribution process 120-2 divides the stream of data 115-1 into duplicate streams of data 115-2 and 115-3 for delivery to the third and fourth network devices 110-3 and 110-4 which in turn deliver the streams of data 115-2 and 115-3 the host devices 105-1 and 105-2, respectively. Such host devices 105-1 and 105-2 are labeled downstream destinations 1 and 2, respectively. In this manner, network devices may propagate a single stream of data 115-1 through the communications network 100 until recipient host devices 105 for that stream are located on segments of the communications network to which access is required over different paths of a network device 110 (network device 110-2 in this example). At that point (e.g., a branch point), a network device 110 configured according to embodiments of the invention is able to distribute the single stream of data 115-1 as duplicate streams 115-2 and 115-3 thus conserving network resources and without requiring the server device 107 to transmit a separate stream of data 115 (e.g., two separate streams in this example) for each recipient host device 105.

Prior to describing the details of this operation, is to be understood that there may exist other network devices within the computer network 100 such as routers, switches, hubs, bridges, or the like that that reside (i.e., are coupled) between some or all of the network devices 110 that do operate according to the techniques of the invention. This is illustrated in FIG. 1 by the existence of network device 112 that is installed between the second network device 110-2 and the third network device 110-3. The network device 112 operates according to conventional data distribution or routing techniques to distribute portions of data for the stream 115-2 through the computer network 100, and does so without the use of multicasting protocols.

FIG. 2 illustrates a detailed example of the protocol communications that transpire between a host device 105-1, the network devices 110 and 112, and the server device 107 such that the host device 105-1 can request and receive a stream of data 115 served by the server device 107. For this example illustration, it is to be assumed that the host device 105-2 (Downstream Destination 2 in FIG. 1) has not yet requested to receive the same stream of data 115 from the server device 107 and thus only the communications between the host 105-1 and the server 107 are shown in FIG. 2.

FIG. 3 is a flow chart of processing steps which generally explain the operation of embodiments of the invention within the network devices 110 as illustrated in FIGS. 1 and 2 to establish a path within each network device 110 for a stream of data 115 from the server 107 to the host 105-1. Such operations allow the host device 105-1 to receive the stream of data 115 from the server device 107, and as will be explained later (FIG. 6), allow other host devices 105-2 to also receive the same stream of data 115 without requiring the server device 107 to transmit multiple copies of the stream 115 onto the network 100.

In step 200 of FIG. 3 and as shown in detail in FIG. 2, according to the general operation of the system of the invention, a host device 105-1 (e.g., a host computer system operating a web browser) that desires to receive the stream of data 115 from the server device 107 can initially provide a request 130-1 for the stream of data 115 through the network 100 to the server device 107 (e.g., server computer system).

The request for the stream of data 130-1 may be any form of message, packet, signal or other indication to the server device 107 that the host device 105-1 has requested to receive the stream of data 115. The host 105 may generate such a request 130, for example, when a user clicks on a Uniform Resource Locator (URL) in a web browser process (not shown) that operates in the host device 105. In this example, the computer network 100 is an IP network and the request 130-1 may be an IP packet that contains as a data portion (i.e., in its payload) a content request (e.g., an HTTP get) indicating the designation of a particular stream of data 115 such as the name or title of an audio file, video clip, or other multimedia presentation or data 115 stored by the server device 107 that the host 105 desires to receive. The stream of data 115 itself may thus be, for example, packets of video data, audio data, or any other type of data or information that the server device 107 can serve onto the network 100. In step 200 then, the network devices 110 and 112 route the request 130-1 to receive the stream of data from the host device 105-1 back to the server device 107 that serves that stream using conventional routing techniques. The route or path through the network that the request 130 takes from the host 105 to the server 107 is not important for purposes of this description of the invention.

In step 201, the server device 107 operating according to embodiments of the invention receives the request 130-1 for the stream from the host device 105-1 and then prepares and forwards or otherwise transmits a data distribution message 131-1 onto the communications network 100. The server device 107 encapsulates the data distribution message 131-1 as a standard network packet such as an IP packet that contains a destination address of the host device 105-1 that requested to receive the stream of data 115. The server forwards this data distribution message 131-1 onto the network 100 for receipt by the first network device 110-1, which may be, for example, a router or other data communications device that provide access to the communications network 100 on behalf of the server device 107. While not shown in this figure, the data distribution message 131-1 includes a special data distribution header (to be explained) in addition to the standard or conventional network data portion header (e.g., encapsulated by the standard IP header). The data distribution header within the data distribution message 131-1 contains an "open-link" field or other indicator that indicates to each network device 110 that they are to establish a path for a particular stream identifier also contained as a field in the data distribution header. Standard network routing protocols ignore the data distribution header as it appears as part of the payload of the packet 131 to such network routing protocols. Thus, these standard routing protocols can forward and otherwise route the data distribution messages 131 as standard packets in the network 100.

Generally, with some exceptions as will be explained, the processing of steps 202 through 211 in FIG. 3 operates in a similar manner within each network device 110 in the communications network 100 that is equipped with an embodiment of the invention. The processing operations in steps 20 through 211 generally begin when a network device 110 receives a data distribution message 131 on route towards the host device 105-1. Such network devices 110 can be, for example, content aware routers or switches that can analyze contents of a packet beyond the standard packet header in order to recognize a data distribution message 131 by its data distribution header. The following explanation of the processing that occurs within steps 202 through 211 will be provided primarily with respect to its occurrence within the first network device 110-1. It is to be understood however that the processing shown in steps 202 through 211 also applies to the other network devices 110.

In step 202, the first network device 110-1 receives the data distribution message 131-1 from an upstream device in the network 100, which is the server device 107 in this first example. By receives, what is preferably meant is that the network device 110-1 obtains the message 131-1 from the network and performs the processing as explained herein with the network device 110-1. In an alternative embodiment, the process of receiving the message 131 includes intercepting the message 131-1 and forwarding it to another device (i.e., an attached device) that then carries out the processing of FIG. 3.

While not shown in detail in the processing steps in FIG. 3 or the illustration FIG. 2 (though as will be explained more fully later), in this embodiment, receipt of a data distribution message 131 by a network device 110 causes the data distribution process 120-1 within the network device 110 to obtain a stream identifier (e.g., from a data distribution header contained in the data distribution message 131) that identifies stream of data 115 for which a communications path is to be established through the network device 110. The data distribution process 120-1 can then determine if a path through this network device 110 already exists for this particular stream of data 115. Assuming for this example that a path does not yet exist through the first network device 110-1, the data distribution process 120-1 can then create a path table (not shown in this figure, but described in detail later) and store the stream identifier (and possibly other information) from the data distribution header in the path table. The purpose of the path table is to store any paths for portions (e.g., packets) of the stream of data 115 that pass through a network device 110. As will be explained, in preferred embodiments, each network device 110 maintains its own path table for each particular stream of data 115 which passes through that network device 110.

In step 203, the network device 110-1 provides an acknowledgement 132-1 of receipt of the first data distribution message 131-1 back to the server device 107. As will be explained shortly, acknowledgement messages 132 that acknowledge receipt of data distribution messages 131 contain a stream identifier obtained from the data distribution message for which they are an acknowledgement. Network devices 110 that receive such acknowledgements 132 establish a path entry in the path table in order to allow those network devices 110 to properly distribute payload distribution messages 133 that carry the stream of data 115 from the server 107 to the hosts 105. For this example of step 203, the network device 110-1 returns the acknowledgement 132-1 back to the server 107.

Next, in step 204, the data distribution process 120-1 in the first network device 110-1 forwards a second data distribution message 131-2 towards the second network device 110-2 (i.e., on route towards the host device 105-1). More specifically, the first network device 110-1 encapsulates a stream identifier contained within the first data distribution message 131-1 and transmits this as the second data distribution message 131-2, for example, using a standard TCP/IP packet for routing using standard routing protocols towards the next network device 110-2 within the computer network 100 on route to the host device 105-1.

As noted above, preferably, the second data distribution message 131-2 (sent from network device 110-1 to 110-2) differs slightly from the first data distribution message 131-1 (sent from the server device 107 to the network device 110-1) in that the second data distribution message 131-2 contains an upstream device identifier indicating that the first network device 110-1 originated the second data distribution message 131-2. Prior to transmitting the second data distribution message 131-2 (step 203), the first network device 110-1 can, for example, replace an upstream device identifier within the data distribution header of the first data distribution message 131-1 (i.e., which initially identified the server device 107 as the upstream device with respect to the first network device 110-1) with an identity (e.g., an IP address) of itself (i.e., the IP address of the first network device 110-1). This processing can take place, for example, upon receipt of the first data distribution message 131-1 in step 202, or just prior to forwarding the second data distribution message 131-2 to the second network device 110-2. This allows network devices 110 that are equipped with an embodiment of the invention that receive a data distribution message 131 to know, for example via examination of the data distribution header (to be explained in detail later) which upstream network device 110 (e.g., the first network device 110-1 in this example) originated the data distribution message 131.

Next, in step 205, the data distribution process 120-1 operating within the first network device 110-1 waits to determine if a timeout, error or an acknowledgment 132 is received (an acknowledgment 132 of receipt of the second data distribution message) at some point in time from a downstream device (e.g., the second network device 110-2 in this example). An acknowledgment 132-2 indicates that the downstream device successfully received the data distribution message 131-2 that the first network device 110-1 transmitted during the processing of step 203. Assume for this example that the data distribution process 120-1 receives the acknowledgement 132-2 (as opposed to a timeout or error) shortly after forwarding the second data distribution process 131-2 to the second network device 110-2. Upon receiving the acknowledgment 132-2 from the data distribution process 120-2 in the second network device 110-2, processing of the data distribution process 120-1 proceeds to step 206. Note that if no acknowledgment is received after a certain timeout period or after multiple re-transmissions of the data distribution message 131-2 without acknowledgement, or if an ICMP destination unreachable or other error message is received in step 205, processing proceeds to step 210, which will be discussed in detail later.

In step 206, the data distribution process 120-1 determines, from the acknowledgment 131-2 of receipt of the second data distribution message (the acknowledgement 131-2 being sent from the second network device 110-2), that the downstream device is equal to the downstream device identified in the acknowledgment 131-2, or in other words, is equal to the second network device 110-2. The data distribution process 120-1 may make this determination (in step 206) by obtaining a downstream device identifier (not shown in FIG. 2) from within a data distribution header contained in the acknowledgment 132-2. The downstream device identifier identifies (e.g., via a network address) the downstream network device identity (e.g., 110-2) that supports the data distribution protocol and that originated the acknowledgment 132-2 as received by the network device 110-1.

Though not shown in this example, it may be the case that many other network devices (e.g., other routers) not equipped with the invention exist between this downstream network device 110-2 and the first network device 110-1, and thus the originator of the acknowledgement 132-2 for a data distribution message 131 is determined from a field of the data distribution header in the acknowledgement 132, instead of by the source address of the standard packet header (e.g., IP source address) that encapsulates the acknowledgement 132. The data distribution header in both the data distribution messages 131 and the acknowledgments 132 thus allows network devices to forward the data distribution messages 131 and acknowledgments 132 to their intended destination upstream or downstream devices that are equipped to understand the protocol of the invention through network devices, other networks segments, and even other network domains that are not equipped with the data distribution protocol features of this invention.

Next, in step 207, the data distribution process 120-1 in the first network device 110-1 establishes at least one path through the network device 110-1 for the stream of data between the upstream device (i.e., the server device 107 for the first network device 110-1) and the downstream device, which is the second network device 110-2 in this example. In particular, the data distribution process 120-1 can obtain a stream identifier from within the acknowledgment 132-2 which identifies a stream of data to which the acknowledgment 132-2 is associated. The data distribution process 120-1 can then create a path entry in the path table (the path table having been created in step 202 upon reception of a first data distribution message 131 for a particular stream identifier) for the stream of data identified by the stream identifier in the acknowledgment 132-2. The data distribution process 120-1 can create this path by associating the downstream device identifier (set with a value in step 206) to the stream identifier in the path table (as set with a value in step 202, as discussed above) to create the path for the stream of data to the downstream network device 110-2.

In this embodiment then, receipt of an acknowledgment 132 causes a network device 110 to receive confirmation that a downstream network device 110 (110-2 in this example) is in receipt of the second data distribution message 131. The acknowledgment 132 thus causes the data distribution process 120 in the network device 110 to complete the path entry for that stream of data to the downstream network device 110.

In step 208, the network device determines if the downstream device was set to a network device or a host device. Since step 206 set the downstream device to a network device, processing proceeds to step 209.

In step 209, the processing of data distribution process within the network device 110-1 is complete with respect to establishing a path for the stream of data through that device.

In this manner, each network device 110 operating a data distribution process 120 according to the techniques of the invention as shown in FIG. 3 can create a path for the data 115 by propagating a data distribution message 131 along the path of network devices 110, 112 towards the host device 105-1 which requested to receive the stream of data identified within the data distribution message 131. It is to be understood that the second data distribution messages 131 sent in step 204 from upstream devices 110, such as 131-2, are treated as a first data distribution message for purposes of the downstream device processing. In other words, for a network device 110 receiving a data distribution message 131, the data distribution message 131 will be the first data distribution message. However, for a network device 110 that transmits a data distribution message 131, that data distribution message will be considered the second data distribution message with respect to this device 110. As such, when the network devices 110 equipped with the invention process each data distribution message 131 and its corresponding acknowledgment 132 for the downstream device, a path is created for the stream of data 115 through that network device 110 that, as will be explained, will cause the device 110 to forward portions of data (payload distribution messages 133, to be explained) for that stream on those paths towards the host devices 105 that requested to receive that data 115.

In FIG. 2, the second network device 110-2 performs the same type of processing steps as explained above with respect to the first network device 110-1 in order to establish a path for the stream of data 115 from the first network device 110-1, through the second network device 110-2 and on to the third network device 110-3. Note that the conventional network device 112 between the second and third network devices 110-2 and 110-3 is not aware of the data distribution headers within the data distribution message 131-3 and the acknowledgement 132-3 and thus ignores these messages and simply routes these messages using their standard packet headers, such as IP packet headers, between the second and third network devices 110-2 and 110-3. In other words, data distribution message and acknowledgment messages 131 and 132 can be tunneled through conventional network devices (e.g., 112) not equipped with the protocol techniques of this invention as explained herein.

Returning attention now to step 205 in FIG. 3, if a network device 110 equipped with embodiment of the invention is performing the processing in step 205 and no acknowledgment 132 is received in response to forwarding a second data distribution message 131 towards a downstream device within the network 100 thus indicating a timeout, or an error message is received by the network device, then the processing of the data distribution process 120 proceeds to step 210.

An example of the occurrence of this condition is illustrated in FIG. 2 when the data distribution process 120-3 operating within the third network device 110-3 forwards the data distribution message 131-4 to the host device 105-1. An advantage of the system explained herein is that host devices 105 do not generally need to be equipped or modified in any manner with embodiments of the invention and thus they are not required to understand data distribution messages 131. Host devices for all purposes herein can ignore the data distribution messages 131 and will thus not return an acknowledgment 132 containing a data distribution header.

In this particular example, the host device 105-1 will not return an acknowledgment 132 to the third network device 110-3. An error message (e.g., an ICMP port not supported or destination unreachable error message, not shown) however may be returned. As such, when the third network device 110-3 does not receive an acknowledgment 132 containing a data distribution header after a predetermined amount of time (e.g., an acknowledgment timeout period, or after a number of retransmissions), the third network device 110-3 can assume that it is the last or end network device at the end of the path to the host device 105-1 that requested to receive the stream of data. In other words, the third network device 110-3 will discover that it is the "end router" after getting a timeout or upon sending one or more data distribution messages 131-4 to the host device 105-1 without acknowledgments.

As such, processing proceeds the step 210 where the data distribution process 120-3 sets the downstream device to be equal to the host device 105-1 (i.e., the network address of the host device 105-1) and processing proceeds to step 207.

When the he third network device 110-3 performs step 207, it establishes a host path through itself for the stream of data between the upstream second network device 110-2 and the downstream host device 105-1. This path however is indicated in the path table (as will be explained shortly) as the end of the path for the stream of data, or in other words, as a "host path" for this particular downstream destination host device. Once the host path is established in the third network device 110-3, processing proceeds from step 207 to step 208.

In step 208 in the third network device 110-3, the downstream device is a host device and thus processing proceeds to step 211.

In step 211, the data distribution process 120-3 in the third network device 110-3 forwards any stream data contained within the data distribution message 131-3 (if any) to the host device 105-1 by removing the data distribution header and forwarding the remainder of the information within the message 131 as a standard packet to the host device 105-1. In other words, in step 211, the data distribution process 120-3 strips out the stream information or stream data 115 from within the data distribution message 131 (if such data exists) and forwards the data on to the host device 105-1 as if the host device 105-1 were receiving the stream of data 115 directly from the server device 107 over the computer network 100. The initial stream data 115 contained within the first data distribution message 131-3 might include, for example, stream connection establishment information required by the host 105-1 for whatever streaming protocol is being used (i.e., such other protocol information being encapsulated by the data distribution header of this invention).

In one embodiment, the initial or first data distribution message 131 that is propagated from the server 107 through the network devices 110 to the host 105 does not contain payload or stream data 115. Instead, this data distribution message 131 includes a packet type field (to be explained shortly) having an "open link," "create path" or other value or signal that indicates that this message 131 is used to establish the path through each network device 110. Thereafter, payload distribution messages 133 (to be explained shortly) that are sent from the server 107 that contain stream data 115 within their payload and also contain a packet type value of "transmit packet" within their data distribution header which indicates that these payload distribution messages 133 are not path establishment messages, but rather, are streaming data messages containing data 115 to be sent to the hosts 105 along paths established in the network devices 110.

Once the data distribution process 120-3 has completed step 211, processing proceeds to step 209 as previously explained.

As will be explained with respect to the processing in FIG. 8, other packets which arrive at the third network device 110-3, such as payload distribution messages 133-3 which contain stream data 115 and also contain a data distribution header indicating that the packet contains data associated with the stream of data 115 served by the server device 107 (i.e., that have a packet type of "transmit packet"), will be treated as data packets. For such packets, generally, the third network device 110-3, which is the last network device 110 in the path for the stream of data serving the host device 105-1, contains a host path and thus the downstream device for that path will be a host device and in step 211, the network device 110-3 will remove any data distribution header information from those payload distribution messages 133 and will then provide or forward (in step 211) the stream of data 115 encapsulated within those payload distribution messages 133 to the host device 105-1 as if that stream of data 115 had originated directly from the server device 107. In this manner, the last network device 110 which provides the stream of data 115 to a host device 105 is responsible for removing the data distribution protocol information of this invention from within the payload distribution message 133 thus allowing the data 115 encapsulated therein to reach the particular destination host device 105.

Using this technique, embodiments of the invention are able to establish a packet broadcasting distribution layout or overlay network within the computer network 100 that comprises the network devices 110 configured with a path table as maintained by the data distribution processes 120. The path table indicates which downstream network devices 110 are to receive payload distribution messages 133 containing the stream of data 115. The data distribution messages 131 and their corresponding acknowledgments 132 allow the network devices 110 that operate according to embodiments of the invention to know on which links or connection routes to other network devices 110 the packets associated with the stream of data must be forwarded.

Once the path table is established within each network device 110 according to the techniques as previously explained, the server device 107 can serve payload distribution messages 133-1 (FIG. 2) containing the data 115 onto the computer network 100. Each payload distribution message 133 (i.e., each packet of the stream containing the data 115) includes a version (to be explained shortly) of the data distribution header that contains a stream identifier identifying the stream of data to which the payload distribution message 133 relates and contains a packet type indicating that this message 133 contains payload or stream data 115. The server device 107 begins streaming the data 115 by sending the payload distribution messages 133 to each network device 110 which provided an acknowledgment 132 of a first data distribution message 131 to the server device 107 (FIGS. 2 and 3).

In the specific example in FIG. 2, to supply the stream of data 115 to the host device 105-1, the server device 107 encapsulates the data 115 (e.g., which may be represented as an entire UDP packet) within a payload distribution message 133-1 that also includes a version of the data distribution header identifying the stream of data contained therein. The server device 107 then forwards this payload distribution message 133-1 to the first network device 110-1. The first network device 110-1 receives the payload distribution message 133-1 and the data distribution process 120-1 recognizes the data distribution header in the payload distribution message 133-1 which indicates that the payload distribution message 133-1 contains or is associated with a specific stream of data 115 (i.e., as identified by a "transmit packet" packet type and stream identifier in the data distribution header of the payload distribution message 133-1). The network device 110-1 then consults the path table as previously established (i.e., as explained with respect to FIG. 3) to determine upon which links or downstream network paths the payload distribution message 133-1 is to be forwarded or transmitted.

In the example in FIG. 2, since there is currently only one path for the stream of data in the network 100, the first network device 110-1 forwards the payload distribution message 133-1 towards the second network device 110-2 as illustrated by the portion of data 133-2. Similar processing happens within each network device 110 to propagate the payload distribution messages 133 containing the data 115 for the stream through the computer network 100. When the third network device 110-3 receives the payload distribution message 133-3 from the second network device 110-2, the data distribution process 120-3 within the third network device 110-3 consults its path table which indicates that it is the last network device 110 in the path for the stream of payload distribution messages 133 (i.e., that the path is a host path). Accordingly, the data distribution process 123 operates to remove the stream data 115 (i.e., the payload) from the payload distribution message 133. This includes removing the data distribution header and forwarding the data 115 as a packet (e.g., a UDP packet) to the host device 105-1, as if that packet 115-1 came directly from the server device 107.

Figure 4:
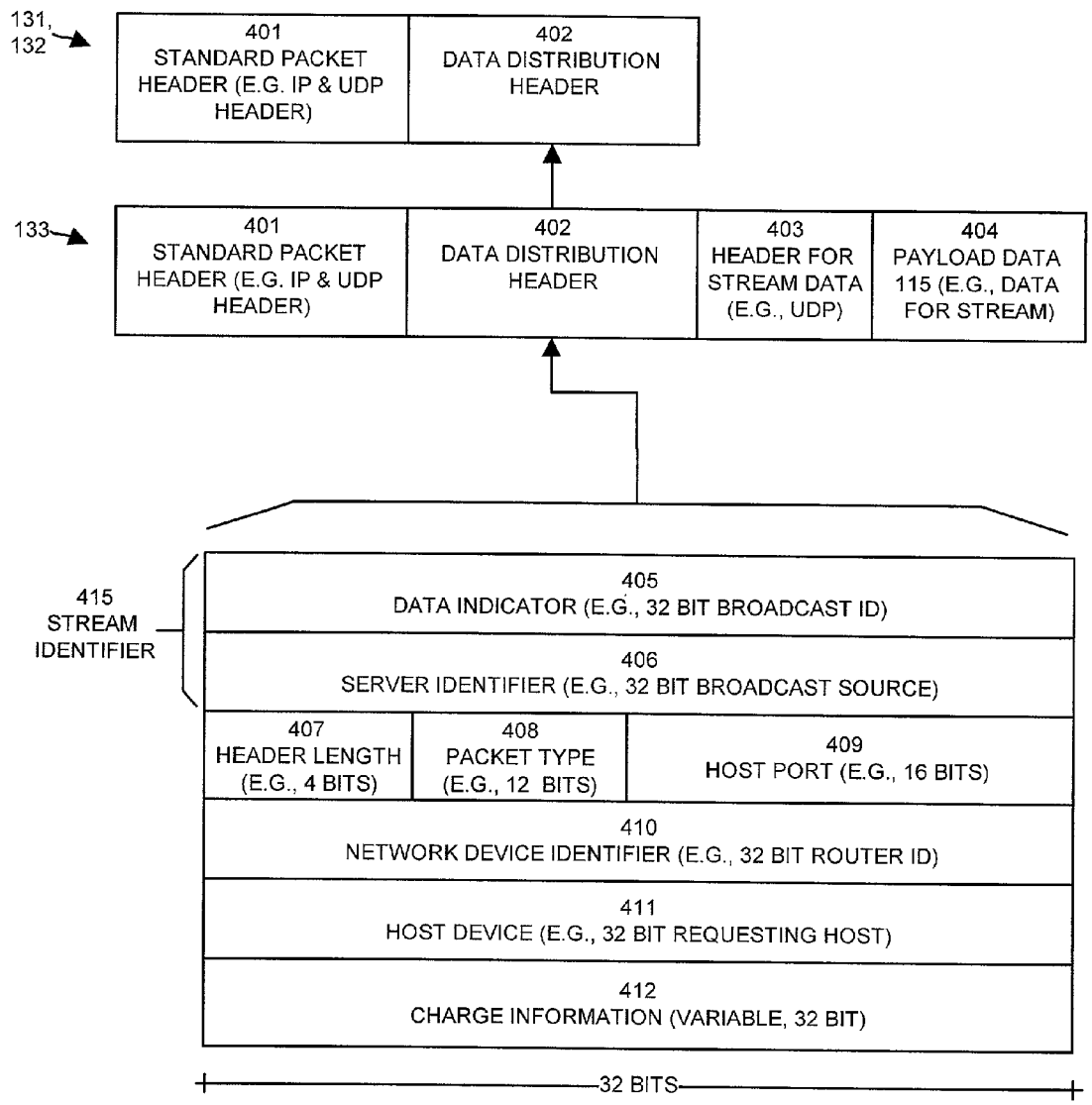
FIG. 4 shows details of data distribution messages that configured according to embodiments of the invention to contain a data distribution header.

FIG. 4 illustrates an example structure of a message such as a packet produced according to embodiments of the invention, such as a data distribution message 131, an acknowledgment 132 of receipt of a data distribution message, and a payload distribution message 133.

As shown, a message 131, 132, 133 produced according to embodiments of the invention generally includes at least two main parts or fields 401 and 402. The first field is the standard packet header 401 such as an IP and UDP header which each network device 110 and 112 can use to route or otherwise distribute the messages 131, 132 or 133 within the computer network 100 from device to device using standard routing protocols. Beneath or encapsulated by the standard packet header field 401 is the data distribution header 402 which is shown in detail in this figure. Note that in a preferred embodiment, the data distribution messages 131 and acknowledgements 132 only contain the standard packet header field 401 and the data distribution header 402, whereas the payload distribution messages 133 also contain the header for stream data 404, which may be a UDP header, for example, and include the payload data 115 which contains the stream data provided by the server 107.

The data distribution header 402 includes a stream identifier 415 which comprises a data indicator field 405 and a server identifier field 406. Also included are a header length field 407, a packet type field 408, the host port field 409, and upstream device identifier 410, a host device field 411 and a charge information field 412 which is an optional field.

The data indicator field 405 identifies a particular stream of data 115 which the server device 107, as identified within the server identifier field 406, serves, transmits or otherwise provides onto the computer network 100. The four bit header length field 407 indicates the length (e.g., in four byte words) of the data distribution header 402. The header length field 407 may contain a default value such as six, which indicates that the data distribution header is six words long, or thirty two bytes.

The packet or message type field 408 identifies the type of message 131, 132 or 133 being transmitted between devices in the computer network 100. In other words, the packet type field 408 identifies whether the message containing this data distribution header 402 is either a data distribution message 131 (e.g., packet type=open link), an acknowledgment 132 (e.g., packet type=open link recv), or a payload distribution message 133 (e.g., packet type=transmit packet) containing the data 115. Other packet types may exist as well. Examples of the details of different uses of the packet type field 408 are provided in APPENDIX A, which describes a particular example embodiment of the system of this invention.

The host port field 409 identifies what the source port is of the request message 130 sent from the host device 105-1 to the server device 107. The last network device 110 (e.g., the third network device 110-3 in the example in FIG. 2) in the path can use the host port field 409 when sending the data 115 (i.e., the payload or data field 404 of the portion of data 133) as a packet 115 to the receiving host device 105-1. Preferably, the server device 107 provides the correct information in the host port field 409 for the data distribution messages 131 only. This information can then be stored in the path table associated with a particular stream of data. The host port field 409 can remain blank for the acknowledgement messages 132 and the payload distribution messages 133.

The network device identifier field 410 indicates the network address of the upstream or downstream network device 110 that created the message 131, 132 or 133. The network device identifier field 410 provides a direct way for a network device 110 that receives a message 131, 132, or 133 to determine which other network device 110 originated the message 131, 132 or 133 in which this data distribution header 402 exists.

The host device field 411 contains an identity of the requesting host 105 which requested to receive the particular stream of data and is used in the data distribution messages 131.

The charge information field 412 is an optional field that can be used as a way for any network device 110 to charge the server device 107 or the host device 105 for the broadcast or data distribution service that this network device 110 is accepting to provide to a particular host device 105 according to the techniques explained herein.

The remaining fields 403 and 404 preferably only exist within the payload distribution message 133 and contain, respectively, packet header information such as a UDP packet header for the stream of data 115, as well as the payload data (e.g., the audio, video, or other data). In one embodiment, a complete UDP packet is represented by the fields 403 and 404. The server device 107 can encapsulate a stream of UDP packets (i.e., as fields 403 and 404), each containing a data distribution header field 402 containing the fields 405 through 412 (or optionally only fields 405 through 408, see below), into a stream of standard IP packets each using the header field 401 and can transmit such a stream of packets as the stream of payload distribution messages 133. Network devices 110 and the server device 107 can recognize such messages based on their data distribution header 402 information. It is to be understood that variations of the data distribution header 402 are contemplated as being within the scope of this invention. For instance, the data distribution header 402 might not require each field shown in FIG. 4 for the payload distribution messages 133. As a specific example, in one embodiment, only fields 405 through 408 are provided in the data distribution header 402 within a payload distribution message 133.

FIG. 5 illustrates an example of the contents of the respective path tables 350-1 through 350-3 which the data distribution processes 120-1 through 120-3 create and maintain in the network devices 110-1 through 110-3, respectively, as a result of the processing explained above and with respect to the example path for the portions of data 133 established from the server device 107 to the host device 105-1 as shown in FIG. 2.

As illustrated in this example, the path table 350-1 for network device 110-1 indicates that payload distribution messages 133-1 for the stream of data 115 are to be forwarded from the first network device 110-1 to the second network device 110-2. Moreover, the path table 350-1 indicates that the host count for the stream 115 is equal to one (1).

The data distribution process 120 in each network device 110 configured according to embodiments of the invention increments the host count for a particular stream of data each time the data distribution process 120 receives an acknowledgment 132 of receipt of a data distribution message 131 from a downstream network device 110 for a particular stream of data as indicated by the stream identifier 415 within that acknowledgment 132.

Each time another host 105 desires to begin receiving the stream of data 115, that host 105, as noted above, provides a request 130 through the network back to the server device 107 serving the stream 115. Also as explained above, in response, the server device 107 provides a data distribution message 131 addressed to that host 105 which gets propagated through each network device 110 in the network 100 back to the host 105 as explained above. Each network device 110 receiving such a data distribution message 131 (i.e., as a first data distribution message 131) forwards an acknowledgment message 132 back to the upstream device that originated the data distribution message 131 (Step 203 in FIG. 3). These acknowledgment messages 132 received at each network device 110 cause the data distribution process 120 within that network device 110 to create the forwarding path entry (column 370 in the path tables 350) in the path table 350 indicating to which downstream devices (i.e., on which network paths or links) the network device 110 should forward the forthcoming payload distribution messages 133. The acknowledgments 132 further cause the data distribution process 120 to increment the host count 380 for the path identified by the stream identifier 415 for the forwarding path 370 upon which the acknowledgment 132 was received. In this manner, each path 370 in the path table for a particular stream of data 115 in a particular network device 110 indicates where payload distribution messages 133 should be sent for that stream identifier 360 and also indicates how many downstream hosts 105 exist on that path 370 that are receiving the data (e.g., 115) using that path or route.

With respect to the example network in FIG. 2, the path table 350-2 in FIG. 5 for the second network device 110-2 indicates that payload distribution messages 133 for the stream 115 should be forwarded to the third network device 110-3. Likewise, the path table 350-3 as maintained by the data distribution process 120-3 within the third network device 110-3 indicates that payload distribution messages 133 for the stream 115 should be forwarded (i.e., when they are received) to the host device 105-1 (i.e., the host path labeled H.D. —for Host Device, 105-1).

When the forwarding column 370 of a path table 350 indicates that the stream of data (as indicated in the stream column 360) contained with a payload distribution message 133 is to be forwarded to a particular host device 501 (i.e., contains a host path), the data distribution process 120 which maintains such a path table 350 "understands" that it is operating in a network device 110 that is the "end device" or "end router" on the path with respect to the host specified in the forward column 370. As such, the network device 110 does not forward the entire payload distribution message 133 to a host device 105. Instead, and as will be explained below in more detail with respect to the processing steps in FIG. 6, prior to forwarding the payload distribution message 133, the data distribution process (e.g., 120-3) which maintains the path table 350-3 removes the standard packet header field 401 and the data distribution header field 402 from the payload distribution message 133 for the stream of data 115 and forwards only the header field 403 for the stream of data along with the payload field 404 containing the data 115 to the host device 105-1 as a packet. Generally then, when a path table 350 indicates that a stream is to be forwarded from a network device 110 to a specific host device 105, when the data distribution process receives a payload distribution message 133 for the stream, the data distribution process 120 within that network device 110 extracts the packet information 403 and the data 115 (field 404 in FIG. 4) to re-create a packet for the stream of data 115 for the host device 105 (for example, to recreate a UDP packet). The data distribution process 120 then forwards that stream data in that reconstituted packet to the host device 105, as if that host device 105 had received that packet for that stream of data directly from the server device 107. The data distribution process 120 can use the host port information from the host port field 409 which was obtained from the data distribution message 131 for this stream of data to properly configure the packet for acceptance at the correct port on the host device 105.

Figure 6:
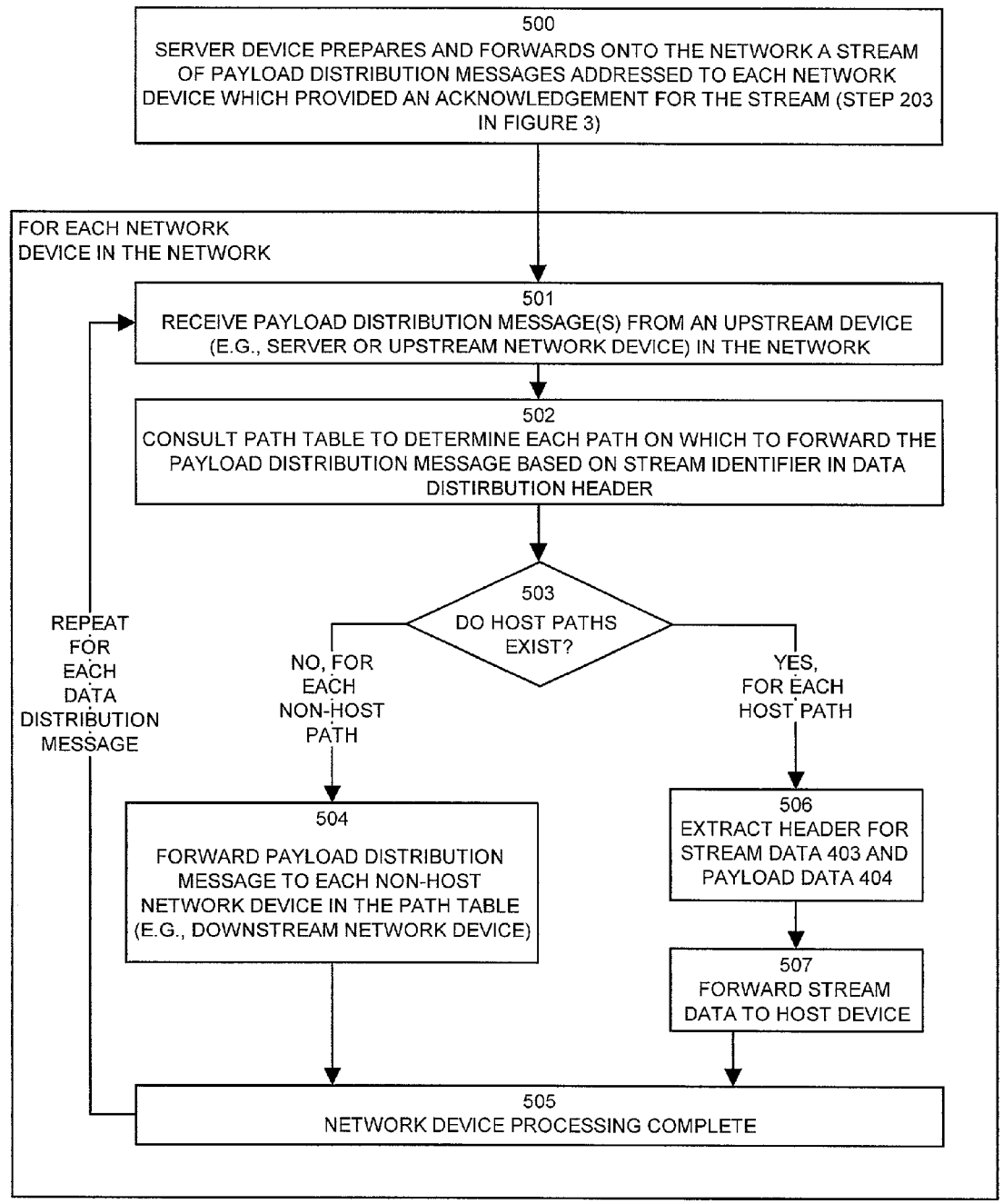
FIG. 6 illustrates an example of communications that take place between network devices and host and server devices to allow a second host device to begin receiving data according to an example operation of embodiments of the invention.

FIG. 6 shows the processing steps that a server device 107 and each data distribution process 120 performs in each network device 110 in order to properly route or otherwise distribute the payload distribution messages 133 containing the stream data 115 to each host 105 that requested to receive such data 115, as generally described above.

In step 500, the server device 107 prepares and forwards onto the network a stream of (i.e., one or more) payload distribution messages 133 addressed (i.e., within the packet header 401) to each network device 110 which provided an acknowledgement 132 for the stream (i.e., for the data distribution message 131 acknowledged in step 203 in FIG. 3). The remaining steps 501 through 508 are performed within each network device 110 that performs (i.e., executes on a processor) a data distribution process 120 configured according to an embodiment of the invention.

In step 501, the data distribution process 120, such 120-1 in network device 110-1, receives a payload distribution message(s) 133-1 from an upstream device (e.g., server or upstream network device) in the network.

In step 502, the data distribution process 120-1 consults the path table 350-1 to determine each forwarding path 370 on which to forward the payload distribution messages 133 based on the stream identifier 415 (i.e., the data indicator field 405) contained within the data distribution header 402.

In step 503, the data distribution process 120-1 determines if any host paths exist in the path table 350-1 for the stream identified in the data distribution header 402 of the payload distribution message 133. In the example in FIG. 2, since the first network device 110-1 does not directly have a direct connection or path to the host 105-1, processing proceeds to step 504.

In step 504, the data distribution process 120-1 forwards the payload distribution message 133-1 to each non-host network device listed in the path table 350-1 (e.g., each downstream network device). In the example in FIG. 2, the first network device forwards the payload distribution message 133-1 to the second network device 110-2, as shown by the payload distribution message 133-2.

Processing then proceeds to step 505 where the data distribution process 120 completes processing within the first network device 110-1 for the payload distribution message 133-1. Note that this processing (steps 501 through 505) is repeated for each payload distribution message 133 received by the network device 110. Each network device 110 within the network performs this processing on each payload distribution message 133 that is received. In this manner, the system of the invention causes the payload distribution messages 133 to be distributed along the paths 370 identified in the path tables 350 in each network device.

Returning attention now back to step 503, if the data distribution process 120 operating in a network device 110 contains one or more host paths within the forwarding paths column 370 within its path table 350, then processing of each payload distribution message 133 that contains a stream identifier associated with this path table 250 proceeds to step 506 for each host path in the path table 350. This situation arises in the example in FIG. 2 when the payload distribution message 133-3 arrives at the third network device 110-3 for distribution to the host 105-1. As shown in the path table 350-3 in FIG. 5 (i.e., the path table for the network device 110-2), the forward path 370-3 lists the host device 105-1 (H.D. 105-1) as a host path for payload distribution messages 133 that contain a stream identifier 360-3 having a value of 115 (the identity of the stream of data for this example). As such, for the host path "H.D. 105-1", the data distribution process 120-3 operating in the network device 110-3 processes steps 506 and 507 for the payload distribution message 133-3.

In step 506, the data distribution process 120-3 extracts, from the payload distribution message 133-3, the header for the stream data 403 and the payload data 404 and recreates a packet, such as a UDP packet, to be sent to the host 105-1 (i.e., to be sent on the host path indicated in the forward path field 370-3 of the path table 350-3).

In step 507, the data distribution process 120-3 forwards the stream data, for example, as the UDP packet comprising extracted (step 506) fields 403 and 404 from the payload distribution message 133-2, to the host device 105-1 identified in the forward path column 370-3 using the host port information (e.g., a UDP port number) received in the data distribution message 131-3 (as explained with respect to FIG. 3). In this manner, the host device 105-1 receives the streaming data 115 as a regular packet without the data distribution header 402.

Figure 7:
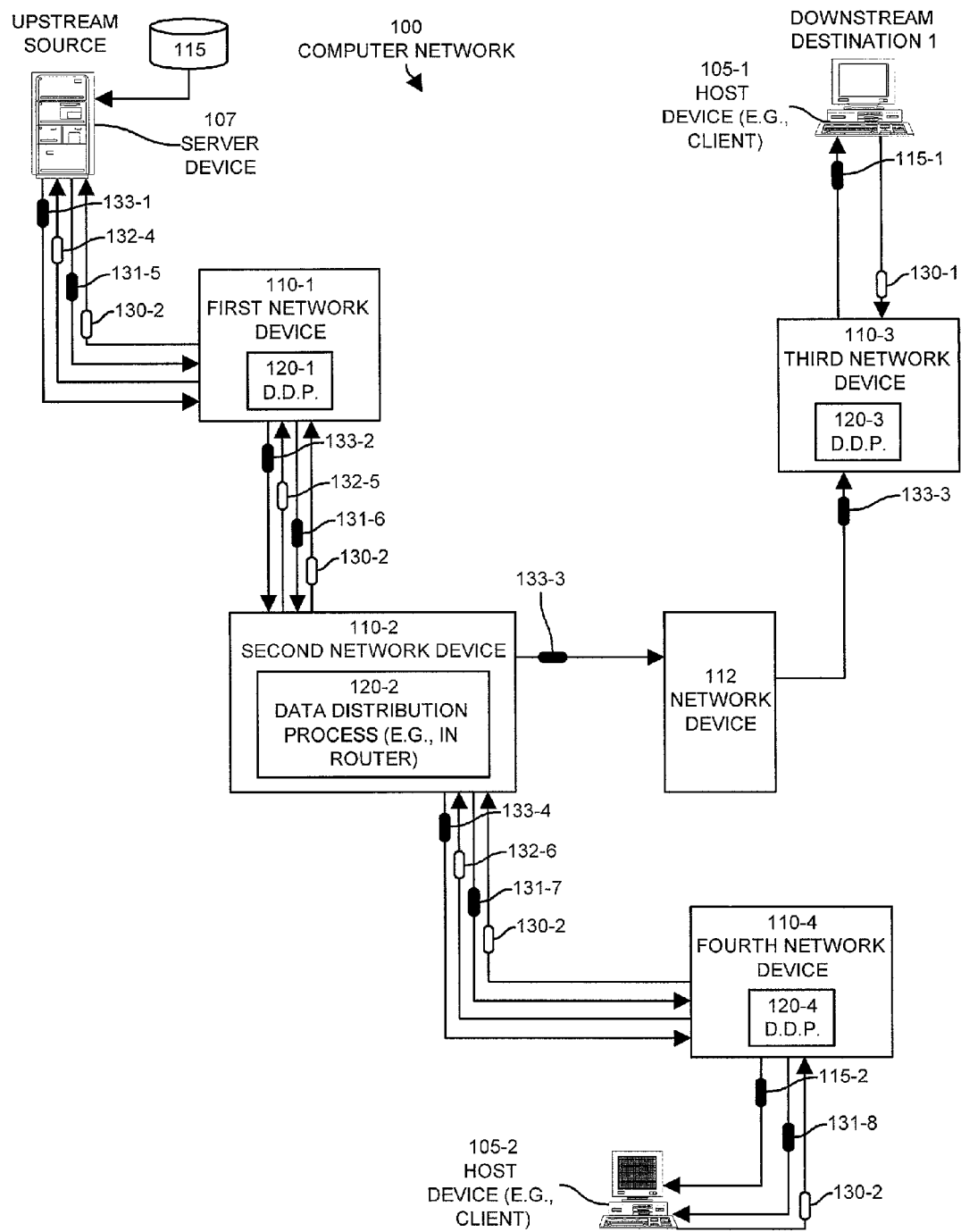
FIG. 7 illustrates an example of the contents of path tables for the network devices illustrated with respect to the example network configuration in FIG. 6.

FIG. 7 illustrates a continuation of the example processing scenario as previously described with respect to FIG. 2 to allow another host computer to receive the stream of data 115. Specifically, in FIG. 7, the protocol communications provided by embodiments of the invention are shown which allow another host device 105-2 to also receive the stream of data 115 which is already currently being served to the first host device 105-1 (i.e., from the server device 107 through the network devices 110-1, 110-2 and 110-3) as was explained above with respect to FIGS. 2 and 3. Each network device 110 within the computer network 100 illustrated in FIG. 7 performs similar processing as was explained with respect to the processing steps in FIG. 3. Accordingly, the specific details of each processing step will not be repeated in detail for this discussion. However, where slight differences occur, those differences will be explained.

Initially, in FIG. 7, a user of the second host device 105-2 decides to begin receiving the stream of data 115 available for the server device 107. As explained above in step 200 with respect to FIG. 3, the second host device 105-2 transmits a request 130-2 for the stream of data 115 onto the network 100 to the server device 107.

Next, just as was done for the request 130-1 from the first host device 105-1, in step 201 in FIG. 3, the server device 107 receives the request 130-2 and prepares and forwards onto the network 100 a new data distribution message 131-5 which contains a destination address of the host device 105-2 within the standard packet header field 401.

The data distribution process 120-1 within the first network device 110-1 receives the data distribution message 131-5 (step 202 in FIG. 3), and configures a new data distribution message 131-6 to contain the network address of the first network device 110-1 into the network device identifier field 410. The data distribution process 120-1 then forwards this (step 204) as a data distribution message 131-6 towards the second network device 110-2. As explained above, the second network device 110-2 provides an acknowledgment 132-5 back to the first network device 110-1 which is detected (step 205) and processed (step 207) to create a path through the first network device 110.

In step 207 (FIG. 3) with respect to the example in FIG. 6, the path table 350-1 already contains a forwarding path 370-1 indicating that data for the stream 115 is to be forwarded from the first network device 110-1 to the second network device 110-2. As such, in step 207, the path is already established for the stream of data and step 207 causes the data distribution process 120-1 to increment the host count field 380-1 in the path table 350-1 as maintained by the data distribution process 120-1. In other words, when each additional data distribution message 131 for a stream of data 115 passes through a network device 110 on a path that already exists as a path through that device 110 for that stream of data 115, when that network device 110 receives an acknowledgment 132 for the data distribution message 131, then that network device 110 (the one receiving the acknowledgment) in step 207 simply increments the host count field 380 in the path table 350 for that stream 360 to indicate that another downstream host (105-2 in this example) is now going to receive the stream of data 115. No new path needs to be established when one already exists to the proper downstream device.

FIG. 8 illustrates the contents of the path tables 350-1 through 350-4 for each network device 110-1 through 110-4 once the processing in each network device 110 is complete as illustrated in FIG. 7 in order to allow the host device 105-2 to have a path for receipt of the stream of data 115-2 contained within the payload distribution messages 133-4.

More specifically, as illustrated in the path table 350-1 for the network device 110-1, once that network device 110-1 has received and processed the acknowledgment 132-5, the host count field 380-1 indicates that two (2) downstream hosts are receiving the stream of data 115 that travels on the path to the network device 110-2.

Referring again to the example in FIG. 7, the second network device 110-2 receives and processes the data distribution message 131-6 (from the first network device 110-1), and forwards another data distribution message 131-7 (containing the network address of the second network device 110-2 within the network device identifier field 410) to the fourth network device 110-4. The data distribution process 120-2 does not need to create a path table 350-2 for the stream 115 identified in the data distribution message 131-6 since this table 350-2 already exists for this stream identifier (115) in the network device 110-2.

As explained above, in response, the fourth network device 110-4 will perform the processing of FIG. 3 to provide an acknowledgment 132-6 back to the second network device 110-2. When the second network device 110-2 processes the acknowledgment 132-6 in step 208 of FIG. 3, the data distribution process 120-2 establishes a second forwarding path 370-2 (indicated as N.D.—network device—110-4, shown in FIG. 8) for the stream of data 115 to the fourth network device 110-4. In other words, the second network device 110-2 will act as a branch point for the stream of data 115 such that when the second network device 110-2 receives the payload distribution messages 133-2 containing the stream of data 115 served by the server device 107, the second network device 110-2 will transmit separate copies 133-3 and 133-4 of the payload distribution messages 133-2 on the network links extending towards the third network device 110-3 and the fourth network device 110-4, respectively. Stated differently, if an acknowledgment 132 is received by a network device 110 for a stream of data for which a connection or path table 350 already exists within that network device 110, and the acknowledgment 132 is from a different downstream device than downstream devices already indicated as paths 370 in the path table 350 for that stream of data, then the network device 110 adds the identity of the other (i.e., the newly acknowledging) downstream network device 110 that provided the acknowledgment 132 as a new path 370 in the path table 350.

It is to be understood then that a network device 110 can have multiple paths for a single stream of data identified in the stream column 360 in a path table 350. In this example, path table 350-2 in FIG. 8 contains two paths to two network devices 110-3 and 110-4 upon which to forward, in step 504 of FIG. 6, the payload distribution message 133 containing that stream identifier. It is to also be understood that a path table 350 can contain multiple forwarding paths 370 to other network devices 110 as well as to other host devices 105 for the same stream of data. In such cases, the identities (e.g., IP addresses) of host devices 105 and network devices 110 would be listed in the forwarding path column 370 for the stream of data.

In this manner, embodiments of the invention create separate paths 370 in the network when required to do so in order to distribute payload distribution messages 133 for the stream of data 115 to different downstream network devices 110 (or to host devices via host paths) that serve different host devices 105 located in different portions or regions of the network 100.

To complete the discussion of the example in FIG. 7, when the fourth network device 110-4 receives the data distribution message 131-7, processing proceeds in a manner similar to the processing as explained above with respect to the third network device 110-3. This results in the establishment of a forwarding path (as designated by Network Device (N.D.) 110-4 listed in the forwarding column 370-2 in the path table 350-2 for the network device 110-2) for payload distribution messages 133-4 from the second network device 110-2 to the fourth network device 110-4. When the fourth network device 110-4 receives the payload distribution messages 133-4, the data distribution process 120-4 removes the standard packet header field 401 (FIG. 4) and the data distribution header field 402 and provides any payload data 404 as a stream of data 115-3 (FIG. 6) to the second recipient host device 105-2, for example, as a stream of UDP packets using the packet header field 403 with the port information 409 retrieved from the data distribution message 131-7. The data distribution process 120-4 can use the information in the host port field 409 from the data distribution header 402 saved from the original data distribution message 131-7 in order to re-construct a valid UDP packet for delivery to the host device 105-2 that appears to have originated at the server device 107.

In this manner, the system of the invention is able to allow a server device 107 to serve data onto a computer network in a multi-cast like manner, while significantly overcoming limitations of conventional multicast protocols. Such problems with conventional systems include inefficient and unstable inter-domain routing of conventional multicast protocols, lack of control over the allocation of multicast addresses (i.e., address clashing), contradictions between current open multicast models and commercial requirements, and security issues relative to open membership of multicast groups.

In particular, the system of the invention allows network devices such as routers to receive the data distribution message for the data to be served from a server device in response to a particular host device on the network requesting to receive the data from that server device. The data distribution message 131 includes a packet type field 408 indicating that this data distribution message is an "open link" or "create path" data distribution header, which causes each network device 110 equipped with the invention to setup the path table 350 (if not already inexistence for this stream) and upon receiving an acknowledgement 132 from the next downstream device 110 of the data distribution message 131, the network device 110 configures the path to that downstream device in the path table.

Thereafter (i.e., once path table(s) exist in the network devices 110), any payload distribution messages 133 for the stream served by the server 107 include a data distribution header 402 that includes a packet type field 408 having a value indicating that the payload distribution message 133 is carrying payload data. The particular stream or broadcast identifier to which the payload distribution message 133 is associated is indicated by the stream identifier 415 (i.e., data indicator field 405 and server identifier field 406). Using the stream identifier 415, each network device 110 can consult the path table 350 for that stream to determine which interface (s) or data link(s) (i.e., which outbound path(s)) that the payload distribution message 133 is to be transmitted upon. This way, the payload distribution messages 133 are only sent once on any particular data link 111 (FIG. 1) in the network 100. If a network device 110 needs to duplicate the payload distribution message 133 for different paths (as indicated in the path table 350 for that stream), then it may do so.

The following explanation discusses how host devices 105 can stop receiving a stream of data 115. Recall that for each acknowledgement 132 of a data distribution message 131 that a network device 110 receives (i.e., from a downstream device), then that network device 110 increments the host count field 380 in the path table 350 associated with that stream of data in the network device 110. This allows a network device 110 to know how many downstream hosts 105 are currently receiving payload distribution messages 133 for path of a particular stream 115. This is important because if each downstream host device 105 that obtains data through a particular path 370 in a network device 110 no longer desires to receive the stream 115, then that network device 110 (i.e., the one that forwards portions of data 133 for that stream) can cease forwarding payload distribution messages 133 on that path 370 to those host devices 105 and can remove the path from the path table 350 for that stream from its memory system. A data distribution process 120 can, in some circumstances as will be explained, decrement a host count 380 for a particular path 370. If all paths for a stream indicate that no hosts are receiving data for that stream, then the entire path table 350 may be removed from the network device memory for that stream identifier.

In the same way that a host device 105 sends a request 130 back to the server device 107 to receive a stream of data, that same host device 105 can send a request 130 (e.g., FIGS. 2 and 6) back to the server device 107 to stop receiving the stream of data 115. In response, the server device 107 can forward a data distribution message 131 that contains special value in the packet type field 408 (FIG. 4) that indicates, to each network device 110 on the route back to the host device 105, that this particular host 105 is requesting to stop receiving the data 115. Network devices 110 forward this data distribution message 131 just as explained above, but do not create new path entries in the path tables 350 due to the packet type field 408 indicating that this data distribution message 131 is removing a host from receiving data on a path.

In response to an acknowledgement 132 of such a data distribution message 131 (i.e., an acknowledgement 132 for a data distribution message 131 that indicates a host is going to stop receiving the data), each network device 110 can decrement, by a value of one (1), the host count field 380 in the path table 350 for the particular path 370 for that stream of data 115 identified by the stream identifier 415 in the acknowledgement 132. In other words, only the host count value for the path used to reach that host desiring to no longer receive the data 115 is decremented in the path table 350.

When the host count field 380 for a particular path 370 for a particular stream of data 360 (i.e., as identified by the path table 350 for that stream of data) becomes zero, then that path 370 to that host (i.e., referencing the next downstream network or host device) can be removed from the path table 350 and the network device 110 will no longer forward portions of data 133 on that path 370. Other paths may exist however upon which the network device 110 will continue to forward portions of data 133 for a stream 115. Removal of a path from the path table 350 simply entails removing the forward identifier in the forwarding path column 370 for the particular network device 110 to which the portions of data 133 are no longer to be sent to by that network device 110 (i.e., the network device 110 that is removing the path).

When the host count field 380 becomes zero (0) for all paths for a particular stream of data (i.e., when the network device 110 decrements the host count field 380 down to zero), or, stated differently, when all paths are removed from the path table 350, that network device 110 can be assured that no downstream host devices 105 are receiving the stream of data 115 from the payload distribution messages 133 that the network device 110 is forwarding. In other words, if a path table exists for a stream of data 115 with no network devices listed in the forward column 370, then no paths exist (i.e., each path had its host count decremented to zero and was thus removed from the path table 350) through that network device 110 for the portions of data 133 for that stream 115. As such, that network device 110 can remove the path table 350 for those payload distribution messages 133 (i.e., for that stream 115) from its memory system to conserve resources in the network device 110.

The Section below (entitled Single Source Tunneled Broadcasting) contains the contents of a paper entitled "Single Source Tunneled Broadcasting." The paper provides an explanation of how one example embodiment of the invention can operate. The contents of the Section are considered part of the disclosure of this invention. It is to be understood, however, that the details presented in the paper in the Section represent one example embodiment of the invention, and are not meant to be limiting of the scope of this invention, as defined by the claims presented after the Section. Accordingly, other embodiments of the invention can differ in operation from the embodiments described above and as described below in the Section.

As an example of such a variation, instead of relying upon acknowledgements 132 to create path entries in a path table 350, network devices 110 equipped with embodiments of the invention can rely on the initial data distribution message 131 to establish a path table 350 and the paths entries (i.e., the entry of the values in the stream, forward and host count fields 360, 370 and 380). Other variations will be apparent to those skilled in the art as well. Those skilled in the art should also understand that such variations in the operations of embodiments of the system of the invention and of the general protocols such as those described herein are meant to be within the scope of the invention.

Other alternative embodiments of the include network devices that can operate in conjunction with other devices to perform the function of a network device as explained above. In such an embodiment, a network device 110 such as a router can be configured to detect the various messages 131, 132 and 133 created as explained above and can pass off or transfer such messages to another attached device that operates the portions of the system of the invention that maintain the path tables, determine which paths to forward messages 131 and 133 upon, and so forth. In other words, a router or other network device configured according to this embodiment can intercept messages 131, 132 and 133 that have a data distribution header 402 and can transfer or otherwise forward these messages to an attached device to make the decision on how to handle these messages 131, 132 and 133 according to the techniques explained above. Then, the attached device can provide a return message back to the router that instructs the router what to do with such messages.

As another alternative embodiment, network devices that receive, in step 202 of FIG. 3, a data distribution message 131, can perform step 203 of acknowledging this message 131 after receiving a downstream acknowledgement (or error or timeout) from a downstream device. In this, manner no network devices 110 create the path entries 370 in the path tables 350 in response to the acknowledgements 132 until the data distribution message 131 has made it way all the way through the network devices 110 to the host device 105 to which it is addressed. When the last network device (e.g., 110-3 in FIG. 2) receives the error message or timeout since the next downstream device is the host device 105-1, then that network device 110-3 "knows" it is the last device for this path for the host device 105-1 and can send its acknowledgement 132-3 back to the network device 110-2. This triggers each network device 110 to send its acknowledgement back upstream. The acknowledgements 132 thus don't start propagating back to the upstream network devices 110 until the last network device 110 has received and processed the data distribution message 131. This ensures that the path entries are not created until a complete network path for the data 115 from the server 107 to the intended host device has been successfully reached.

Single Source Tunneled Broadcasting

This document describes an alternative protocol to provide Multicast or Broadcast of packets over multiple hops. This protocol does not have the complexity of broadcast registration and facilitates the management between inter domain networks. Upgrade of the further routers down the path to the listeners is optional, although recommended. No modification is needed on the host receiving the broadcast. The routers can record each broadcast event they support as well as the corresponding link on which they forward the broadcast packets. The last router supporting the Tunneled Broadcasting over UDP Protocol (TBUP) sends the packets in the format expected by the hosts.

DEFINITIONS

| | |
|---|---|
| End Router: | The router servicing the connection that is the most downstream, therefore the closest to the requesting host. In some cases, it could be on the same subnet as the requesting host. |
| Broadcasting Source Server: | The server broadcasting a streaming program. |
| Upstream router: | A router located closer to the Broadcaster source server in relation to another router. |
| Downstream router: | A router located closer to the listening host in relation to another router. |
| Requesting host: | The host requesting to listen to the broadcast event. |
| Broadcasting link: | This is defined by a virtual connection between an upstream router and its immediate downstream router for a particular broadcasting event. |

Figure 9:
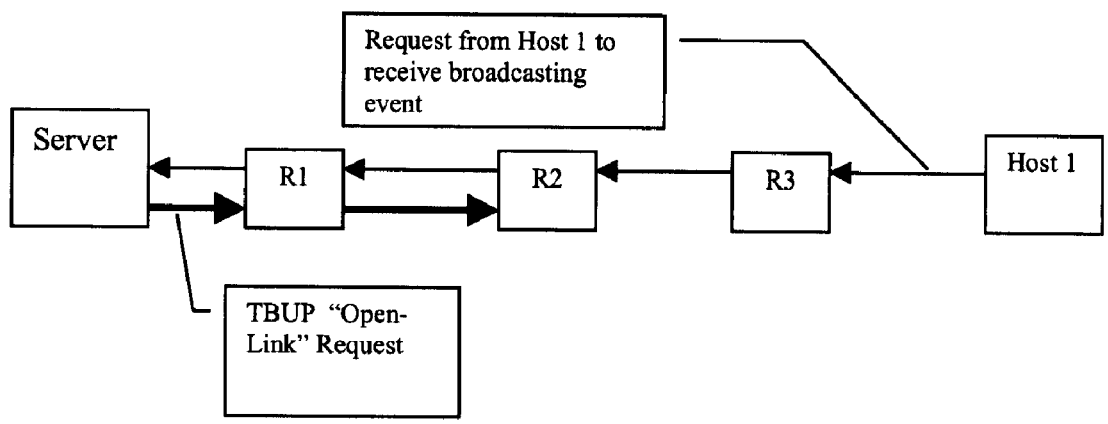
FIG. 9 illustrates an example of a broadcast server sending an open link packet.

The TBUP protocol generally contains two steps. The first one is to establish a packet broadcasting distribution layout, or if you prefer, for the network to know on which links the broadcasting packets must be forwarded. To do so, the broadcast server sends a TBUP "open-link" packet back to the host that just requested to receive the broadcast (FIG. 9). This packet uses the TBUP header, which is described in FIG. 12. TBUP uses a well-known port and is over UDP.

Let say that Router R1 supports this protocol. Then this Router R1 will intercept this TBUP Open-Link packet. It will identify the Broadcast event from the Broadcast ID and IP address of the server and create a table of links on which it should broadcast packet. At first, this table is empty. It then forwards a TBUP Open-Link packet towards the Host 1. The new TBUP Open-Link packet contains Router R1's IP address in the TBUP header. Router R1 will also send back a TBUP Open-Link-Ack back to the server to inform it that it is the next node down the path, it is its down-stream router.

Figure 10:
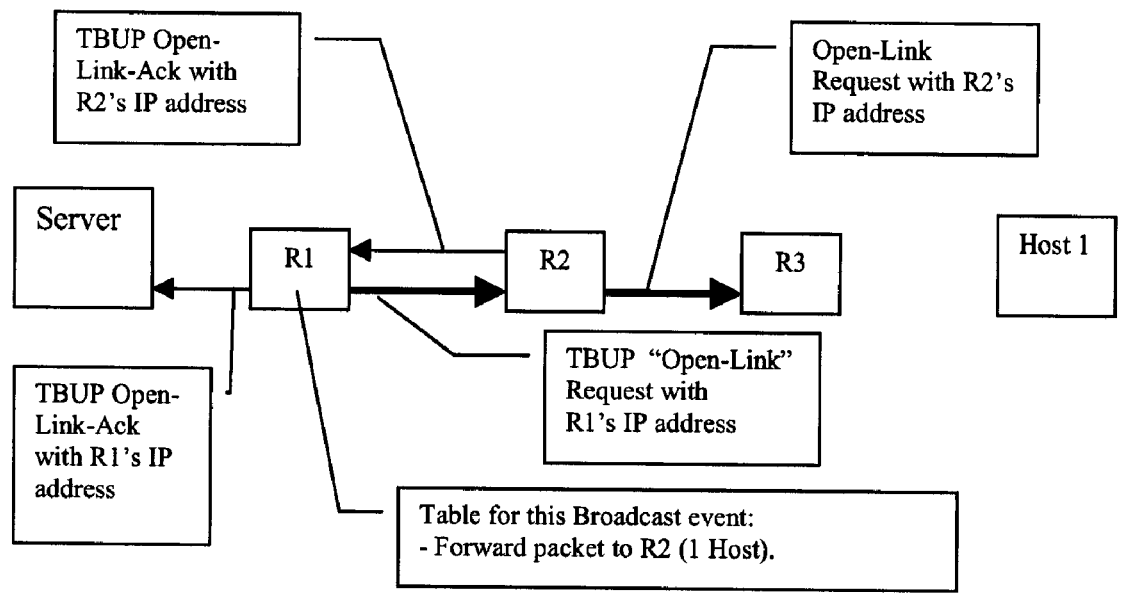
FIG. 10 illustrates an example of processing an open link packet.

If router R2 does not support the protocol, the packet is not intercepted and continues its way down to Host 1. If router R2 supports the protocol, it will perform the same action as Router R1 did. Upon reception of R2's Open-Link-Ack, router R1 will register R2's IP address in its table created for that broadcasting event. See FIG. 10.

Eventually, the TBUP Open-Link packet gets to the last router that supports the protocol before reaching the Host. In this case, this router will discover it is the "End Router" after getting a timeout or upon sending multiple TBUP Open Link packets without acknowledgments. Hosts are not supposed to respond to the TBUP messages. No Host is required or expected to support the protocol.

Figure 11:
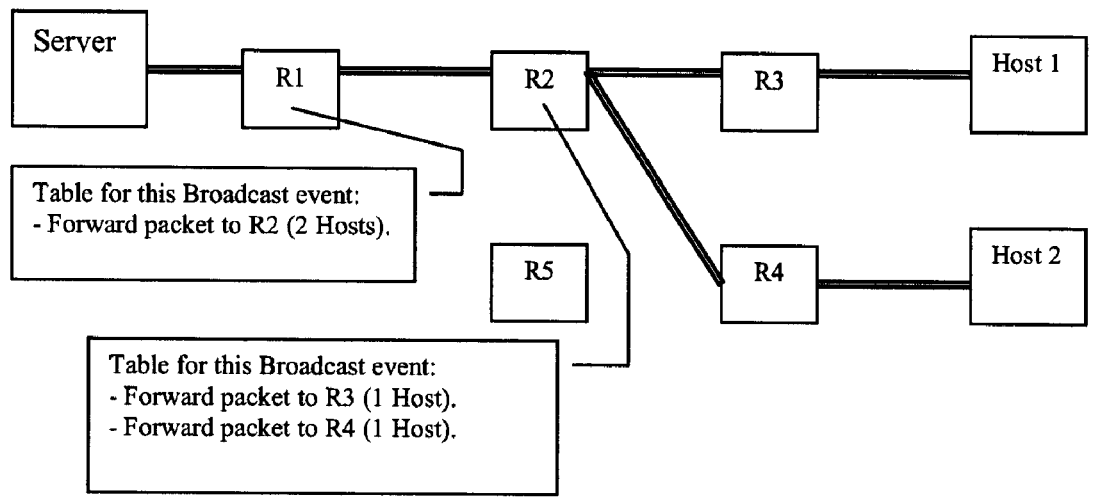
FIG. 11 illustrates an example of a new host joining a group.

When a new host wants to join the group, if it shares some of the existing path back to the server, then this is where the benefit of the protocol exists. The same benefit is that no duplication of packets is required. FIG. 11 attempts to illustrate this.

If more than one route exists to send a particular TBUP message towards a host, this route should preferably be the one that already has an existing connection for that broadcasting event. This increases the chance to get an identical downstream router. For example, in FIG. 11, if router R1 can reach Host 2 through either Router R2 or R5, then router R2 having already an established link should be the choice to forward the Open-Link packet.

It is important for a router to discover it is the End Router since it will have to strip out the TBUP header in which the broadcasting packets will be encapsulated. When transmitting streaming packets, the TBUP Header encapsulates the UDP header and its streaming payload. That TBUP header is in turn encapsulated in UDP and IP. The End Router has the task to remove this encapsulation and use the UDP port of the Host that it recorded earlier as the destination UDP port.

This protocol could be used in conjunction with the standard multicast, at least when the branches are sharing the same Ethernet medium. An End Router serving multiple hosts could be a good candidate to switch from this protocol to standard multicast.

Detailed Operation:

FIG. 12 illustrates an example format of the TBUP header.

The Broadcast ID is an identifier established by the Broadcasting source server. The Broadcasting source contains the IP address of the server. Along with the Broadcast ID, it uniquely identifies a specific broadcasting program.

The Length field identifies the length in words (4 bytes) of this TBUP protocol. This value should be set to 6. All router code should consider a possible different value for this value for future possible expansion of this protocol. However, extra fields not described here should not require to be supported, hence any future version should be backward compatible.

The Packet Type identifies the type of message transmitted.

The Host Port identifies what is the source Port of the packet sent by the Requesting Host. The End Router will use this information when sending a broadcasted packet to that host. The server fills in this information.

The Source Router field contains the IP address of the Router sending this packet. It is a direct way for an upstream router to find its downstream router and vice versa rather than be required to look at the IP header.

The Requesting Host field is the IP address of the Requesting Host that initiated an Open-Link request to be sent by the Broadcasting source server.

The Service Charge Index is an optional field that could be used as a way for any downstream routers to charge the broadcasting source server for the broadcast service they are accepting to offer. Very possibly, the involved parties have already reached an agreement together, defining those service charges.

The Packet Type can be one of the following:

| | |
|---|---|
| Open-Link (0x001): | Broadcasting source server is requesting a new link to be established. |
| Open-Link-Recv (0x002): | The downstream router acknowledges the reception of the Open-Link packet but does not claim the service will be supported yet. The decision to support the service is pending upon some conditions to be verified. Normally this happens when the router reached a limit on its resources and can only support this connection if it already has an identical one to be forwarded on the same link. It therefore needs to verify if the downstream router is the same to an existing connection, so this router needs to wait upon the answer from the downstream router. |
| Open-Link-Ack (0x003): | The downstream router acknowledges reception of the Open-Link request and accepts to deliver the service. |
| Open-Link-Rej-End (0x004): | The downstream router rejects to support the service and no downstream router to this one were found. It will send this packet to its upstream router to indicate that. |
| Recv-OL-Rej-End (0x005): | An upstream router acknowledges reception of an Open-Link-Rej-End using this packet. |
| Recv-OL-Recv (0x006): | The upstream router acknowledges reception of the Open-Link-Recv packet by sending such packet. |
| Recv-OL-Ack (0x007): | The upstream router sends this packet back to the sender of an Open-Link-Ack to acknowledge reception of such packet. |
| OL-Transmit-Ready (0x008): | A downstream packet that detects it is on the same subnet as the Requesting Host will send this packet to the Broadcasting Source Server. It signals it is the End Router and therefore transmission can start for this particular Requesting Host. Any router in-between will detect this packet and open the connection. This packet is also sent in the case where the End Router has been established due to a timeout after waiting for a reply to an Open-Link Request. |
| Recv-OL-TR (0x009): | The Broadcasting Source Server sends this back to the End Router that sent the OL-Transmit-Ready packet. |
| Transmit-Packet (0x00A): | This identifies an encapsulated streaming packet. If a router in-between did not intercept any OL-Transmit-Ready packet for this connection, it will immediately open it. |
| Close-Link (0x00B): | This event signals a link must be closed. This is detected when a host no longer wishes to be part of the broadcasting event or does not send keep-alive packets anymore. |
| Close-Link-Ack (0x00C): | A router returns this type of packet to acknowledge reception of the Close-Link packet. |

As mentioned earlier, each broadcast is identified by the source IP address of the broadcast server as well as a broadcast ID created by this same server. The Open-Link packet has for a destination IP address, the IP address of the host who sent the request to listen to the broadcast. When the Open-Link packet reaches a router supporting this protocol, three things can happen:

1. The router immediately accepts to support the service. It will record a new path table when this is the first connection it receives for this particular broadcasting event. It will record the Broadcast ID, the IP address of the server and of the Requesting host into this table. Then, the router will copy its IP address in the "Service Router" field of the TBUP Open-Link packet and will forward the packet towards the requesting host. Finally, this router will send back an Open-Link-Ack to the "Service Router" field if non-empty, otherwise it will forward this to the Broadcasting source server. If it is the first router, it will be towards the Broadcasting source server. The Open-Link-Ack packet will still have the same Broadcast ID and the IP address of the Broadcasting source.

2. The router does not want to support the service. This could happen if the owner of the router is not willing to provide service to the broadcasting server or simply because it is lacking the resource to support this new connection. In this case, the router will forward as is, the Open-Link packet to the requesting host. A simple such blind forward is what will happen in the case where the router does not support the TBUP protocol. However, if this router detects it is on the same subnet as the requesting host, it will reply with an Open-Link-Rej-End packet. This will also be the case if the ISP owning the router rejects the service for this server and owns all subsequent downstream routers towards that host.

3. Finally, the last action that could happen is the router is already servicing this broadcasting event but can add this new host only if it will be using an existing branch. In other words, the downstream router for this connection must already be in the table for the support of another connection. In such case, the router will not be required to duplicate the streaming packets for this particular new connection. To acknowledge reception of the Open-Link packet, the router will send back an Open-Link-Recv packet to its upstream router. This will indicate that the Open-Link packet has been received but approval to support the connection is pending upon conditions. The conditions may not only be related to resource availability but could also regard some service charge authorization that needs to be verified.

In case 3, if this router decides not to service the connection, three possible packet types may be returned. In the case there is a downstream router but it is not on the same path as another existing connection, this downstream router may have returned either an Open-Link-Recv or an Open-Link-Ack to this router. In both cases, this router will forward back this TBUP packet as it is to its upstream router. By receiving this packet, the upstream router will change the recorded downstream router for this connection.

Alternatively, if no downstream router where found and it is possibly the reason for this router not to accept the connection, in this case it will send back an Open-Link-Rej-End to its upstream router. The upstream router will then become the End Router. In return, it will send back a Recv-OL-Rej-End packet back to the downstream router rejecting the service to indicate reception of the packet. If it had already accepted to support the connection, this upstream router will then send an OL-Transmit-Ready packet to the Broadcasting Source Server.

When an upstream router receives an Open-Link-Ack from a downstream router to which it forwarded the Open-Link packet, its path table is modified. The goal will be to change the IP address of the requesting host it had recorded earlier with the IP address present in the Service Router field. However, if the router already has an existing path entry for this particular broadcast which contains this Service Router IP address, it will instead just increase a counter (e.g., host count) for that field and delete the previous entry recorded with the host IP address. When this happens, it means we have another host located on the same path that requested to listen to this same broadcasting event. This situation reduces the number of resources required to support a particular broadcasting event on this router, and therefore, leaves space for other hosts to join.

Finally, the upstream router that received this Open-Link-Ack will send back a Received-OL-Ack packet back so the downstream router knows its Open-Link-Ack packet has been received and therefore, does not need to retransmit it.

CONCLUSION

The foregoing description of embodiments of the invention is not intended to be limiting. Rather, any limitations to embodiments of the invention are presented in the following claims.

What is claimed is:

1. In a network device in a network, a method of establishing a communications path through the network device for a stream of data, the method comprising the steps, of:
   receiving a first data distribution message from an upstream device in the network;
   acknowledging receipt of the first data distribution message to the upstream device in the network;
   forwarding a second data distribution message to a downstream device in the network; and
   determining if the network device receives an acknowledgment of receipt of the second data distribution message, and if the network device receives an acknowledgment, establishing at least one path through the network device for a stream of data identified by the first data distribution message between the upstream device and a downstream device identified in the acknowledgment;
   wherein the step of receiving a first data distribution message from an upstream device in the network comprises the steps of:
   obtaining, from the first data distribution message, a stream identifier that identifies the stream of data for which the communications path is to be established through the network device;
   storing the stream identifier in a path table, the path table used by a data distribution process in the network device to identify paths for the stream of data through the network device;
   configuring an upstream device identifier in the second data distribution message with an identity of the network device that received the first data distribution message;
   wherein the step of establishing at least one path through the network device between the upstream device and the downstream device comprises the steps of:
   obtaining a downstream device identifier from within the acknowledgment, the downstream device identifier identifying a downstream network device that supports the data distribution protocol and that originated the acknowledgment;
   obtaining a stream identifier from within the acknowledgment, the stream identifier identifying a stream of data to which the acknowledgment is associated;
   and creating a path entry in the path table for a stream of data identified by the stream identifier in the acknowledgment received by the network device by associating the downstream device identifier to the stream identifier in the path table to create a path for the stream of data to each downstream device associated with the stream identifier.

2. The method of claim 1 wherein the stream identifier includes at least one of:
   i) a data indicator for the stream of data; and
   ii) an identification of the server computer system providing the stream of data.

3. The method of claim 1 wherein the step of creating a path entry in the path table for the stream of data identified by the stream identifier further comprises the step of:
   incrementing a host device counter associated with the path entry in the path table for the stream of data in order to track how many host devices use a path defined by the path entry in the network device to receive the stream of data.

4. The method of claim 1 wherein if, in the step determining if the network device receives an acknowledgment of receipt of the second data distribution message, the network device determines that it did not receive the acknowledgment, the method performs the operations of:

establishing at least one host path through the network device for the stream of data, the at least one host path indicating that a host device coupled to the network device is to receive the stream of data; and receiving a payload distribution message containing the stream of data, the payload distribution message being associated with a stream identifier in the path table;

removing payload data from the payload distribution message; and forwarding the payload data to the host device as the stream of data.

5. The method of claim 1 further including the steps of:

receiving a payload distribution message from an upstream device in the network, the payload distribution message containing a stream identifier associated with the at least one path through the network device;

consulting a path table containing the at least one path through the network device to determine each path on which to forward the payload distribution message; and forwarding the payload distribution message on each path determined from the step of consulting the path table such that downstream network devices can receive the payload distribution message.

6. The method of claim 1 wherein:

the acknowledgment includes a downstream device identifier identifying the network device as a downstream device with respect to the upstream device that originated the first data distribution message and to which the acknowledgement is forwarded;

the acknowledgment includes a stream identifier identifying a stream of data to which the acknowledgment is associated; and wherein the acknowledgement is received the by the upstream device that originated the second data distribution message and is treated as a downstream acknowledgement forwarded from the downstream network device.

7. The method of claim 1 wherein the downstream device is a network device and wherein the step of forwarding forwards the entire first data distribution message to the downstream device such that the downstream device can establish a communications path through the network for the stream of data.

8. The method of claim 1 wherein:

the downstream device is a host device that requested receipt of the stream of data; and wherein the step of forwarding comprises the step of:

forwarding a payload portion of the stream of data in the first data distribution message to the host device such that the host device can receive the stream of data over the communications path through the network.

9. The method of claim 1 wherein:

the first data distribution message contains a destination network address identifying a host device which provided a request to a server device for the stream of data served from the server device; and wherein the step of forwarding forwards the second data distribution message to a downstream device using a routing protocol that selects a route that forwards the second data distribution message towards a host device which provided the request to the server device for the stream of data.

10. The method of claim 9 wherein if the routing protocol determines that there are multiple routes that can be used to forward the second data distribution message towards a host device which provided the request to the server device for the stream of data, the routing protocol selects a route to a downstream network device that contains an established path for the stream of data identified by a stream identifier within the first data distribution message.

11. The method of claim 1 further including the steps of:

receiving a portion of data associated with the stream of data, the portion of data originating from a server device that serves the stream of data and including a data distribution header containing a stream identifier for this portion of data; and forwarding the portion of data to a downstream device associated with each of the at least one path for the stream of data as identified in a path table associated with the stream identifier, such that the portion of data is distributed on each of the at least one path in the path table towards host devices that requested to receive the stream of data.

12. The method of claim 1 wherein establishing at least one path through the network device for a stream of data identified by the first data distribution message comprises establishing at least one path through the network device for a stream of data identified by the first data distribution message, the stream selected from the group consisting of a real time audio stream of data, a real time video stream of data, a real time multimedia stream of data, a non-real time stream of audio data, a non-real time stream of video data, or a non-real time stream of multimedia data.

13. The method of claim 1 wherein the step of determining comprises determining if the network device receives an acknowledgment of receipt of the second data distribution message, and if the network device receives an acknowledgment, establishing at least one path through the network device for a stream of data identified by the first data distribution message between the upstream device and a downstream device identified in the acknowledgment, the stream of data transmitted between the upstream device and a downstream device via a multicast protocol and the network device not multicast enabled.

14. A network device comprising:

an communications interface;

a memory system;

a processor; and an interconnection mechanism coupling the communications interface, the memory system, and the processor;

wherein the memory system is configured with a data distribution application, that when performed on the processor, provides a data distribution process that establishes a communications path through the network device in a network for a stream of data by performing the operations of:

receiving, via the communications interface, a first data distribution message from an upstream device in the network;

acknowledging receipt of the first data distribution message to the upstream device in the network;

forwarding, via the communications interface, a second data distribution message to a downstream device in the network; and determining if the network device receives an acknowledgment of receipt of the second data distribution message, and if the network device receives an acknowledgment, establishing, in the memory system, at least one path through the network device for a stream of data identified by the first data distribution message between the upstream device and a downstream device identified in the acknowledgment;

wherein when the data distribution process performs the operation of receiving a first data distribution message from an upstream device in the network, the data distribution process performs the operations of:

obtaining, from the first data distribution message in the memory system, a stream identifier that identifies the stream of data for which the communications path is to be established through the network device;

storing the stream identifier in a path table in the memory system, the path table used by a data distribution process in the network device to identify paths for the stream of data through the network device; and configuring an upstream device identifier in the second data distribution message in the memory system with an identity of the network device that received the first data distribution message;

wherein when the data distribution process performs the operation of establishing at least one path through the network device between the upstream device and the downstream device, the data distribution process performs the operations of:

obtaining a downstream device identifier from within the acknowledgment in the memory system, the downstream device identifier identifying a downstream network device that supports the data distribution protocol and that originated the acknowledgment;

obtaining a stream identifier from within the acknowledgment in the memory system, the stream identifier identifying a stream of data to which the acknowledgment is associated; and creating a path entry in the path table for a stream of data identified by the stream identifier in the acknowledgment received by the network device by associating the downstream device identifier to the stream identifier in the path table to create a path for the stream of data to each downstream device associated with the stream identifier.

15. The network device of claim 14 wherein the stream identifier includes at least one of:

i) a data indicator for the stream of data; and ii) an identification of the server computer system providing the stream of data.

16. The network device of claim 14 wherein when the data distribution process performs the operation of creating a path entry in the path table for the stream of data identified by the stream identifier, the data distribution process performs the operation of:

incrementing a host device counter associated with the path entry in the path table for the stream of data in order to track how many host devices use a path defined by the path entry in the network device to receive the stream of data.

17. The network device of claim 14 wherein when the data distribution process performs the operation of determining if the network device receives an acknowledgment on the communications interface of receipt of the second data distribution message, if the network device does not receive the acknowledgment, the data distribution process performs the operations of:

establishing, in a path table in the memory system, at least one host path through the network device for the stream of data, the at least one host path indicating that a host device coupled to the network device is to receive the stream of data; and receiving, via the communications interface, a payload distribution message containing the stream of data, the payload distribution message being associated with a stream identifier in the path table;

removing payload data from the payload distribution message; and forwarding the payload data to the host device as the stream of data.

18. The network device of claim 14 wherein the data distribution process further performs the operation of:

receiving, via the communications interface, a payload distribution message from an upstream device in the network, the payload distribution message containing a stream identifier associated with the at least one path through the network device;

consulting a path table in the memory system containing the at least one path through the network device to determine each path on which to forward the payload distribution message; and forwarding the payload distribution message on each path determined from the step of consulting the path table such that downstream network devices can receive the payload distribution message.

19. The network device of claim 14 wherein the downstream device is a network device and wherein when the data distribution process performs the operation of forwarding, the data distribution process forwards the entire first data distribution message to the downstream device such that the downstream device can establish a communications path through the network for the stream of data.

20. The network device of claim 14 wherein:

the downstream device is a host device that requested receipt of the stream of data; and wherein when the data distribution process performs the operation of forwarding, the data distribution process performs the operation of:

forwarding a payload portion of the stream of data in the first data distribution message to the host device such that the host device can receive the stream of data over the communications path through the network.

21. The network device of claim 14 wherein:

the first data distribution message contains a destination network address identifying a host device which provided a request to a server device for the stream of data served from the server device; and wherein when the data distribution process performs the operation of forwarding, the network device forwards the at least a portion of the second data distribution message to a downstream device using a routing protocol that selects a route that forwards the second data distribution message towards a host device which provided the request to the server device for the stream of data.

22. The network device of claim 21 wherein if network device operating the routing protocol determines that there are multiple routes that can be used to forward the second data distribution message towards a host device which provided the request to the server device for the stream of data, the network device operates the routing protocol to select a route to a downstream network device that contains an established path for the stream of data identified by a stream identifier within the first data distribution message.

23. The network device of claim 14 wherein the data distribution process further performs the operations:

receiving a portion of data associated with the stream of data, the portion of data originating from a server device that serves the stream of data and including a data distribution header containing a stream identifier for this portion of data; and forwarding the portion of data to a downstream device associated with each of the at least one path for the stream of data as identified in a path table associated with the stream identifier, such that the portion of data is distributed on each of the at least one path in the path table towards host devices that requested to receive the stream of data.

24. The network device of claim 14 wherein:

the acknowledgment includes a downstream device identifier identifying the network device as a downstream device with respect to the upstream device that originated the first data distribution message and to which the acknowledgement is forwarded;

the acknowledgment includes a stream identifier identifying a stream of data to which the acknowledgment is associated; and wherein the acknowledgement is received the by the upstream device that originated the data distribution message and is treated as an acknowledgement forwarded from the network device.

25. The network device of claim 14 wherein, when establishing, in the memory system, at least one path through the network device for the stream of data comprises establishing at least one path through the network device for a stream of data identified by the first data distribution message, the stream selected from the group consisting of a real time audio stream of data, a real time video stream of data, a real time multimedia stream of data, a non-real time stream of audio data, a non-real time stream of video data, or a non-real time stream of multimedia data.

26. The network device of claim 14 wherein the memory system is configured, when determining, to determine if the network device receives an acknowledgment of receipt of the second data distribution message, and if the network device receives an acknowledgment, establishing, in the memory system, at least one path through the network device for a stream of data identified by the first data distribution message between the upstream device and a downstream device identified in the acknowledgment, the stream of data transmitted between the upstream device and a downstream device via a multicast protocol and the network device not multicast enabled.

* * * * *